United States Patent
Garrow et al.

(10) Patent No.: US 9,843,742 B2
(45) Date of Patent: Dec. 12, 2017

(54) THERMAL IMAGE FRAME CAPTURE USING DE-ALIGNED SENSOR ARRAY

(71) Applicant: FLIR Systems, Inc., Wilsonville, OR (US)

(72) Inventors: Stanley H. Garrow, Lompoc, CA (US); Nicholas Högasten, Santa Barbara, CA (US); Theodore R. Hoelter, Goleta, CA (US); Katrin Strandemar, Rimbo (SE); Pierre Boulanger, Goleta, CA (US); Barbara Sharp, Santa Barbara, CA (US); Eric A. Kurth, Santa Barbara, CA (US); Malin Ingerhed, Linköping (SE)

(73) Assignee: FLIR Systems, Inc., Wilsonville, OR (US)

( * ) Notice: Subject to any disclaimer, the term of this patent is extended or adjusted under 35 U.S.C. 154(b) by 679 days.

(21) Appl. No.: 13/893,809

(22) Filed: May 14, 2013

(65) Prior Publication Data

US 2013/0250125 A1    Sep. 26, 2013

Related U.S. Application Data

(63) Continuation-in-part of application No. PCT/US2012/041744, filed on Jun. 8, 2012, and a
(Continued)

(51) Int. Cl.
*H04N 5/33*      (2006.01)
*H04N 5/365*     (2011.01)

(52) U.S. Cl.
CPC ............. *H04N 5/33* (2013.01); *H04N 5/3658* (2013.01)

(58) Field of Classification Search
CPC .............................. H04N 5/33; H04N 5/3658
(Continued)

(56) References Cited

U.S. PATENT DOCUMENTS

| 2,764,055 A | 9/1956 | Clemens et al. |
| 5,258,621 A | 11/1993 | Noble |

(Continued)

FOREIGN PATENT DOCUMENTS

| CA | 2764055 | 7/2012 |
| CN | 1917590 | 2/2007 |

(Continued)

OTHER PUBLICATIONS

Written Opinion of international application PCT/US2012/041749 (published as WO/2012/170949), (dated 2013).*
(Continued)

*Primary Examiner* — Christopher S Kelley
*Assistant Examiner* — Kathleen Walsh
(74) *Attorney, Agent, or Firm* — Haynes and Boone, LLP

(57) ABSTRACT

Various techniques are provided to capture one or more thermal image frames using an infrared sensor array that is fixably positioned to substantially de-align rows and columns of infrared sensors. In one example, an infrared imaging system includes an infrared sensor array comprising a plurality of infrared sensors arranged in rows and columns and adapted to capture a thermal image frame of a scene exhibiting at least one substantially horizontal or substantially vertical feature. The infrared imaging system also includes a housing. The infrared sensor array is fixably positioned within the housing to substantially de-align the rows and columns from the feature while the thermal image frame is captured.

25 Claims, 23 Drawing Sheets

Related U.S. Application Data continuation-in-part of application No. PCT/US2012/041749, filed on Jun. 8, 2012, and a continuation-in-part of application No. PCT/US2012/041739, filed on Jun. 8, 2012, and a continuation-in-part of application No. 13/622,178, filed on Sep. 18, 2012, now Pat. No. 9,237,284, which is a continuation-in-part of application No. 13/529,772, filed on Jun. 21, 2012, now Pat. No. 8,780,208, which is a continuation of application No. 12/396,340, filed on Mar. 2, 2009, now Pat. No. 8,208,026.

(60) Provisional application No. 61/646,781, filed on May 14, 2012, provisional application No. 61/656,889, filed on Jun. 7, 2012, provisional application No. 61/545,056, filed on Oct. 7, 2011, provisional application No. 61/495,873, filed on Jun. 10, 2011, provisional application No. 61/495,879, filed on Jun. 10, 2011, provisional application No. 61/495,888, filed on Jun. 10, 2011.

(58) Field of Classification Search
USPC ....... 348/164, 208.4, 260–283; 382/295–297
See application file for complete search history.

(56) References Cited

U.S. PATENT DOCUMENTS

| | | | |
|---|---|---|---|
| 5,394,520 | A * | 2/1995 | Hall ............. G01S 3/7864 345/566 |
| 5,541,414 | A * | 7/1996 | Hori ............. G08B 13/191 250/349 |
| 5,561,460 | A * | 10/1996 | Katoh ............. H04N 5/2254 348/219.1 |
| 5,654,549 | A | 8/1997 | Landecker et al. |
| 5,717,208 | A * | 2/1998 | Woolaway, II ....... G02B 26/101 250/332 |
| 5,721,427 | A | 2/1998 | White et al. |
| 5,881,182 | A | 3/1999 | Fiete et al. |
| 5,903,659 | A | 5/1999 | Kilgore |
| 5,960,097 | A * | 9/1999 | Pfeiffer ............. G06K 9/3241 342/357.59 |
| 6,297,794 | B1 | 10/2001 | Tsubouchi et al. |
| 6,330,371 | B1 * | 12/2001 | Chen ............. G01S 3/7864 250/347 |
| 6,348,951 | B1 | 2/2002 | Kim |
| 6,373,522 | B2 * | 4/2002 | Mathews ............. 348/144 |
| 6,396,543 | B1 | 5/2002 | Shin et al. |
| 6,424,843 | B1 | 7/2002 | Reitmaa et al. |
| 6,583,416 | B1 * | 6/2003 | Villani ............. G01J 5/06 250/332 |
| 6,633,231 | B1 | 10/2003 | Okamoto et al. |
| 6,642,497 | B1 * | 11/2003 | Apostolopoulos H01L 27/14625 250/201.5 |
| 6,681,120 | B1 | 1/2004 | Kim |
| 6,759,949 | B2 | 7/2004 | Miyahara |
| 6,883,054 | B2 | 4/2005 | Yamaguchi et al. |
| 6,911,652 | B2 | 6/2005 | Walkenstein |
| 7,050,107 | B1 | 5/2006 | Frank et al. |
| D524,785 | S | 7/2006 | Huang |
| 7,084,857 | B2 | 8/2006 | Lieberman et al. |
| 7,132,648 | B2 * | 11/2006 | Ratiff ............. G01J 5/52 250/252.1 |
| 7,208,733 | B2 | 4/2007 | Mian et al. |
| 7,263,379 | B1 | 8/2007 | Parkulo et al. |
| 7,279,675 | B2 * | 10/2007 | Cohen ............. G02B 23/22 250/216 |
| 7,284,921 | B2 | 10/2007 | Lapstun et al. |
| 7,294,817 | B2 * | 11/2007 | Voigt ............. H04N 5/33 250/208.1 |
| 7,296,747 | B2 | 11/2007 | Rohs |
| 7,305,368 | B2 | 12/2007 | Lieberman et al. |
| 7,321,783 | B2 | 1/2008 | Kim |
| 7,333,832 | B2 | 2/2008 | Tsai et al. |
| 7,377,835 | B2 | 5/2008 | Parkulo et al. |
| 7,420,663 | B2 | 9/2008 | Wang et al. |
| 7,453,064 | B2 | 11/2008 | Lee |
| 7,477,309 | B2 | 1/2009 | Cuccias |
| 7,566,942 | B2 | 7/2009 | Viens et al. |
| 7,567,818 | B2 | 7/2009 | Pylkko |
| 7,572,077 | B2 | 8/2009 | Lapstun et al. |
| 7,575,077 | B2 | 8/2009 | Priepke et al. |
| 7,595,904 | B2 | 9/2009 | Lapstun et al. |
| 7,616,877 | B2 * | 11/2009 | Zarnowski ............. G02B 7/028 348/240.3 |
| 7,627,364 | B2 | 12/2009 | Sato |
| 7,697,962 | B2 | 4/2010 | Cradick et al. |
| 7,723,686 | B2 | 5/2010 | Hannebauer |
| 7,725,141 | B2 | 5/2010 | Su |
| 7,728,281 | B2 | 6/2010 | Chen |
| 7,735,974 | B2 | 6/2010 | Silverbrook et al. |
| 7,747,454 | B2 | 6/2010 | Bartfeld et al. |
| 7,760,919 | B2 | 7/2010 | Namgoong |
| 7,761,114 | B2 | 7/2010 | Silverbrook et al. |
| 7,772,557 | B2 * | 8/2010 | Anderson ............. H04N 5/33 250/252.1 |
| 7,773,870 | B2 | 8/2010 | Naruse |
| 7,801,733 | B2 | 9/2010 | Lee et al. |
| 7,805,020 | B2 | 9/2010 | Trudeau et al. |
| 7,810,733 | B2 | 10/2010 | Silverbrook et al. |
| 7,872,574 | B2 | 1/2011 | Betts et al. |
| 7,880,777 | B2 * | 2/2011 | Anderson ............. H04N 5/33 348/164 |
| 7,900,842 | B2 | 3/2011 | Silverbrook et al. |
| 7,903,152 | B2 | 3/2011 | Kim |
| 7,947,222 | B2 | 5/2011 | Bae et al. |
| 7,960,700 | B2 | 6/2011 | Craig et al. |
| 8,189,050 | B1 | 5/2012 | Hughes et al. |
| 8,189,938 | B2 * | 5/2012 | Hohenberger ..... H04N 5/23293 340/435 |
| 8,203,116 | B2 | 6/2012 | Young |
| 8,208,026 | B2 | 6/2012 | Högasten et al. |
| 8,275,413 | B1 | 9/2012 | Fraden et al. |
| 8,305,577 | B2 | 11/2012 | Kivioja et al. |
| 8,345,226 | B2 | 1/2013 | Zhang |
| 8,378,290 | B1 * | 2/2013 | Speake ............. H04N 5/33 250/252.1 |
| 8,537,343 | B2 | 9/2013 | Zhang |
| 8,781,420 | B2 | 7/2014 | Schlub et al. |
| 8,825,112 | B1 | 9/2014 | Fraden et al. |
| 2002/0006337 | A1 | 1/2002 | Kimura et al. |
| 2002/0058352 | A1 * | 5/2002 | Jacksen ............. H01L 27/14649 438/54 |
| 2002/0122036 | A1 | 9/2002 | Sasaki |
| 2002/0135571 | A1 | 9/2002 | Klocek et al. |
| 2002/0140542 | A1 | 10/2002 | Prokoski et al. |
| 2002/0149600 | A1 | 10/2002 | Van Splunter et al. |
| 2003/0007193 | A1 | 1/2003 | Sato et al. |
| 2003/0093805 | A1 | 5/2003 | Gin |
| 2003/0112871 | A1 | 6/2003 | Demos |
| 2003/0122957 | A1 | 7/2003 | Emme |
| 2003/0146975 | A1 | 8/2003 | Joung et al. |
| 2003/0198400 | A1 | 10/2003 | Alderson et al. |
| 2003/0223623 | A1 | 12/2003 | Gutta et al. |
| 2004/0047518 | A1 | 3/2004 | Tiana |
| 2004/0101298 | A1 | 5/2004 | Mandelbaum et al. |
| 2004/0127156 | A1 | 7/2004 | Park |
| 2004/0128070 | A1 | 7/2004 | Schmidt et al. |
| 2004/0157612 | A1 | 8/2004 | Kim |
| 2004/0165788 | A1 | 8/2004 | Perez et al. |
| 2004/0169860 | A1 | 9/2004 | Jung et al. |
| 2004/0207036 | A1 | 10/2004 | Ikeda |
| 2004/0256561 | A1 | 12/2004 | Beuhler et al. |
| 2005/0030314 | A1 | 2/2005 | Dawson |
| 2005/0067852 | A1 | 3/2005 | Jeong |
| 2005/0068333 | A1 | 3/2005 | Nakahashi et al. |
| 2005/0068517 | A1 * | 3/2005 | Evans ............. G01S 7/481 356/5.01 |
| 2005/0089241 | A1 | 4/2005 | Kawanishi et al. |
| 2005/0093890 | A1 | 5/2005 | Baudisch |
| 2005/0110803 | A1 | 5/2005 | Sugimura |
| 2005/0138569 | A1 | 6/2005 | Baxter et al. |

(56) References Cited

U.S. PATENT DOCUMENTS

| | | | |
|---|---|---|---|
| 2005/0157942 A1* | 7/2005 | Chen | G06K 9/40 382/275 |
| 2005/0169655 A1 | 8/2005 | Koyama et al. | |
| 2005/0184993 A1 | 8/2005 | Ludwin et al. | |
| 2005/0213813 A1 | 9/2005 | Lin et al. | |
| 2005/0213853 A1 | 9/2005 | Maier et al. | |
| 2005/0219249 A1 | 10/2005 | Xie et al. | |
| 2005/0247867 A1* | 11/2005 | Volgt | H04N 5/33 250/252.1 |
| 2005/0248912 A1 | 11/2005 | Kang et al. | |
| 2005/0265688 A1 | 12/2005 | Kobayashi | |
| 2005/0270784 A1 | 12/2005 | Hahn et al. | |
| 2005/0277447 A1 | 12/2005 | Buil et al. | |
| 2006/0039686 A1 | 2/2006 | Soh et al. | |
| 2006/0060984 A1 | 3/2006 | Wakabayashi et al. | |
| 2006/0077246 A1 | 4/2006 | Kawakami et al. | |
| 2006/0097172 A1 | 5/2006 | Park | |
| 2006/0120712 A1 | 6/2006 | Kim | |
| 2006/0132642 A1 | 6/2006 | Hosaka et al. | |
| 2006/0140501 A1 | 6/2006 | Tadas | |
| 2006/0147191 A1 | 7/2006 | Kim | |
| 2006/0154559 A1 | 7/2006 | Yoshida | |
| 2006/0210249 A1 | 9/2006 | Seto | |
| 2006/0234744 A1 | 10/2006 | Sung et al. | |
| 2006/0240867 A1 | 10/2006 | Wang et al. | |
| 2006/0256226 A1* | 11/2006 | Alon | G02B 27/0012 348/335 |
| 2006/0262210 A1 | 11/2006 | Smith et al. | |
| 2006/0279632 A1* | 12/2006 | Anderson | H04N 5/33 348/164 |
| 2006/0279758 A1 | 12/2006 | Myoki | |
| 2006/0285907 A1 | 12/2006 | Kang et al. | |
| 2007/0004449 A1 | 1/2007 | Sham | |
| 2007/0019077 A1 | 1/2007 | Park | |
| 2007/0019099 A1 | 1/2007 | Lieberman et al. | |
| 2007/0019103 A1 | 1/2007 | Lieberman et al. | |
| 2007/0033309 A1 | 2/2007 | Kuwabara et al. | |
| 2007/0034800 A1 | 2/2007 | Huang | |
| 2007/0052616 A1 | 3/2007 | Yoon | |
| 2007/0057764 A1 | 3/2007 | Sato et al. | |
| 2007/0103479 A1 | 5/2007 | Kim et al. | |
| 2007/0120879 A1 | 5/2007 | Kanade et al. | |
| 2007/0132858 A1 | 6/2007 | Chiba et al. | |
| 2007/0139739 A1 | 6/2007 | Kim et al. | |
| 2007/0159524 A1 | 7/2007 | Kim et al. | |
| 2007/0189583 A1 | 8/2007 | Shimada et al. | |
| 2007/0211965 A1 | 9/2007 | Helbing et al. | |
| 2007/0216786 A1 | 9/2007 | Hung et al. | |
| 2007/0222798 A1 | 9/2007 | Kuno | |
| 2007/0247611 A1 | 10/2007 | Tamaki et al. | |
| 2007/0248284 A1 | 10/2007 | Bernsen et al. | |
| 2007/0274541 A1 | 11/2007 | Uetake et al. | |
| 2007/0285439 A1 | 12/2007 | King et al. | |
| 2007/0286517 A1 | 12/2007 | Paik et al. | |
| 2007/0296838 A1* | 12/2007 | Erdtmann | H04N 5/33 348/243 |
| 2007/0299226 A1 | 12/2007 | Park et al. | |
| 2008/0038579 A1 | 2/2008 | Schuisky et al. | |
| 2008/0056606 A1* | 3/2008 | Kilgore | F41G 7/2213 382/275 |
| 2008/0056612 A1 | 3/2008 | Park et al. | |
| 2008/0079834 A1 | 4/2008 | Chung et al. | |
| 2008/0095212 A1* | 4/2008 | Jonnalagadda | G01J 5/0003 374/124 |
| 2008/0112012 A1 | 5/2008 | Yokoyama et al. | |
| 2008/0112594 A1* | 5/2008 | Williams | F41G 7/007 382/107 |
| 2008/0151056 A1 | 6/2008 | Ahamefula | |
| 2008/0165190 A1 | 7/2008 | Min et al. | |
| 2008/0165342 A1 | 7/2008 | Yoshida et al. | |
| 2008/0165359 A1* | 7/2008 | Mattox | G01J 4/04 356/367 |
| 2008/0170082 A1 | 7/2008 | Kim | |
| 2008/0211916 A1 | 9/2008 | Ono | |
| 2008/0218474 A1 | 9/2008 | Ahn et al. | |
| 2008/0248833 A1 | 10/2008 | Silverbrook et al. | |
| 2008/0259181 A1* | 10/2008 | Yamashita | H04N 5/2351 348/229.1 |
| 2008/0266079 A1 | 10/2008 | Lontka | |
| 2008/0278772 A1 | 11/2008 | Silverbrook et al. | |
| 2008/0284880 A1* | 11/2008 | Numata | H04N 5/217 348/241 |
| 2008/0292144 A1 | 11/2008 | Kim | |
| 2008/0297614 A1 | 12/2008 | Lieberman et al. | |
| 2008/0316350 A1* | 12/2008 | Gottwald | H01L 27/14618 348/340 |
| 2009/0023421 A1 | 1/2009 | Parkulo et al. | |
| 2009/0027525 A1 | 1/2009 | Lin et al. | |
| 2009/0040042 A1 | 2/2009 | Lontka | |
| 2009/0040195 A1 | 2/2009 | Njolstad et al. | |
| 2009/0052883 A1 | 2/2009 | Lee et al. | |
| 2009/0129700 A1 | 5/2009 | Rother et al. | |
| 2009/0131104 A1 | 5/2009 | Yoon | |
| 2009/0141124 A1 | 6/2009 | Liu et al. | |
| 2009/0148019 A1 | 6/2009 | Hamada et al. | |
| 2009/0160951 A1* | 6/2009 | Anderson | H04N 5/2252 348/208.4 |
| 2009/0213110 A1 | 8/2009 | Kato et al. | |
| 2009/0215479 A1 | 8/2009 | Karmarkar | |
| 2009/0227287 A1 | 9/2009 | Kotidis | |
| 2009/0238238 A1 | 9/2009 | Hollander et al. | |
| 2009/0257679 A1 | 10/2009 | Högasten | |
| 2009/0278048 A1 | 11/2009 | Choe et al. | |
| 2009/0297062 A1 | 12/2009 | Molne et al. | |
| 2009/0303363 A1 | 12/2009 | Blessinger | |
| 2010/0013979 A1* | 1/2010 | Golub | G01J 3/2803 348/340 |
| 2010/0020229 A1 | 1/2010 | Hershey et al. | |
| 2010/0045809 A1* | 2/2010 | Packard | G06T 7/0028 348/222.1 |
| 2010/0066866 A1 | 3/2010 | Lim | |
| 2010/0090965 A1 | 4/2010 | Birkler | |
| 2010/0090983 A1 | 4/2010 | Challener et al. | |
| 2010/0103141 A1 | 4/2010 | Challener et al. | |
| 2010/0113068 A1 | 5/2010 | Rothschild | |
| 2010/0131268 A1 | 5/2010 | Moeller | |
| 2010/0144387 A1 | 6/2010 | Chou | |
| 2010/0163730 A1 | 7/2010 | Schmidt et al. | |
| 2010/0165122 A1 | 7/2010 | Castorina et al. | |
| 2010/0220193 A1 | 9/2010 | Hogasten et al. | |
| 2010/0234067 A1 | 9/2010 | Silverbrook et al. | |
| 2010/0245582 A1 | 9/2010 | Harel | |
| 2010/0245585 A1 | 9/2010 | Fisher et al. | |
| 2010/0245826 A1 | 9/2010 | Lee | |
| 2010/0314543 A1 | 12/2010 | Lee et al. | |
| 2010/0329583 A1 | 12/2010 | Whiteside et al. | |
| 2011/0043486 A1 | 2/2011 | Hagiwara et al. | |
| 2011/0063446 A1 | 3/2011 | McMordie et al. | |
| 2011/0102599 A1 | 5/2011 | Kwon et al. | |
| 2011/0115793 A1* | 5/2011 | Grycewicz | G06T 3/4069 345/428 |
| 2011/0117532 A1 | 5/2011 | Relyea et al. | |
| 2011/0121178 A1 | 5/2011 | Strandemar | |
| 2011/0121978 A1 | 5/2011 | Schwörer et al. | |
| 2011/0122075 A1 | 5/2011 | Seo et al. | |
| 2011/0128384 A1 | 6/2011 | Tiscareno et al. | |
| 2012/0007987 A1 | 1/2012 | Gaber | |
| 2012/0083314 A1 | 4/2012 | Ng et al. | |
| 2012/0091340 A1 | 4/2012 | Young | |
| 2012/0184252 A1 | 7/2012 | Hirsch | |
| 2012/0200766 A1* | 8/2012 | Hjelmstrom | H04N 5/2252 348/369 |
| 2012/0211648 A1 | 8/2012 | Linsacum et al. | |
| 2012/0229650 A1 | 9/2012 | Matthews | |
| 2012/0273688 A1 | 11/2012 | Tsai et al. | |
| 2012/0274814 A1 | 11/2012 | Wajs | |
| 2012/0276954 A1 | 11/2012 | Kowalsky | |
| 2012/0292518 A1 | 11/2012 | Goldstein | |
| 2012/0320086 A1 | 12/2012 | Kasama et al. | |

(56) References Cited

U.S. PATENT DOCUMENTS

| | | | |
|---|---|---|---|
| 2013/0204570 A1 | 8/2013 | Mendelson et al. | |
| 2013/0307991 A1* | 11/2013 | Olsen | H01L 27/14649 348/164 |
| 2013/0320220 A1 | 12/2013 | Donowsky | |

FOREIGN PATENT DOCUMENTS

| | | |
|---|---|---|
| CN | 2874947 | 2/2007 |
| CN | 2899321 | 5/2007 |
| CN | 101065953 | 10/2007 |
| CN | 201203922 | 3/2009 |
| CN | 101635754 | 1/2010 |
| CN | 201481406 | 5/2010 |
| CN | 201550169 | 8/2010 |
| CN | 101859209 | 10/2010 |
| CN | 201628839 | 11/2010 |
| CN | 101945154 | 1/2011 |
| CN | 102045423 | 5/2011 |
| CN | 102045448 | 5/2011 |
| CN | 102055836 | 5/2011 |
| CN | 201869255 | 6/2011 |
| CN | 201897853 | 7/2011 |
| CN | 102178510 | 9/2011 |
| CN | 102415091 | 4/2012 |
| CN | 202261481 | 5/2012 |
| CN | 102880289 | 1/2013 |
| CN | 202998279 | 6/2013 |
| DE | 102006057431 | 6/2008 |
| EP | 1983485 | 10/2008 |
| EP | 2136554 | 12/2009 |
| EP | 2477391 | 7/2012 |
| EP | 2533226 | 12/2012 |
| JP | 07193753 A * | 7/1995 |
| JP | 1997275518 | 4/1999 |
| JP | 2002344814 | 11/2002 |
| JP | 2004/004465 | 1/2004 |
| JP | 2004048571 | 2/2004 |
| JP | 2004/241491 | 8/2004 |
| JP | 2006098098 | 4/2006 |
| JP | 2006105655 | 4/2006 |
| JP | 2007006475 | 1/2007 |
| JP | 2007/267035 | 10/2007 |
| JP | 2007325842 | 12/2007 |
| JP | 2010181324 | 8/2010 |
| JP | 2012231309 | 11/2012 |
| KR | 20000026757 | 5/2000 |
| KR | 100227582 | 11/2000 |
| KR | 100272582 | 11/2000 |
| KR | 20000073381 | 12/2000 |
| KR | 100285817 | 1/2001 |
| KR | 20010001341 | 1/2001 |
| KR | 20010002462 | 1/2001 |
| KR | 20010010010 | 2/2001 |
| KR | 20010014992 | 2/2001 |
| KR | 20010044756 | 6/2001 |
| KR | 20010050263 | 6/2001 |
| KR | 20010060752 | 7/2001 |
| KR | 20010068202 | 7/2001 |
| KR | 20010070355 | 7/2001 |
| KR | 20010074565 | 8/2001 |
| KR | 20020006967 | 1/2002 |
| KR | 20020044339 | 6/2002 |
| KR | 20020049605 | 6/2002 |
| KR | 20060071220 | 6/2002 |
| KR | 20020061406 | 7/2002 |
| KR | 20020061920 | 7/2002 |
| KR | 20020069690 | 9/2002 |
| KR | 20020078469 | 10/2002 |
| KR | 20020083368 | 11/2002 |
| KR | 20020083961 | 11/2002 |
| KR | 20020085124 | 11/2002 |
| KR | 20020085490 | 11/2002 |
| KR | 20020095752 | 12/2002 |
| KR | 20030000332 | 1/2003 |
| KR | 20030007030 | 1/2003 |
| KR | 20030012444 | 2/2003 |
| KR | 20030016607 | 3/2003 |
| KR | 20030024545 | 3/2003 |
| KR | 20030037101 | 5/2003 |
| KR | 20030051140 | 6/2003 |
| KR | 20030055693 | 7/2003 |
| KR | 20030056667 | 7/2003 |
| KR | 20030067116 | 8/2003 |
| KR | 20030085742 | 11/2003 |
| KR | 20030088968 | 11/2003 |
| KR | 20040001684 | 1/2004 |
| KR | 20040001686 | 1/2004 |
| KR | 20040023826 | 3/2004 |
| KR | 20040027692 | 4/2004 |
| KR | 20040033223 | 4/2004 |
| KR | 20040033532 | 4/2004 |
| KR | 20040033986 | 4/2004 |
| KR | 20040033993 | 4/2004 |
| KR | 20040039868 | 5/2004 |
| KR | 20040040296 | 5/2004 |
| KR | 20040042475 | 5/2004 |
| KR | 20040044624 | 5/2004 |
| KR | 100437890 | 6/2004 |
| KR | 20040054416 | 6/2004 |
| KR | 20040058969 | 7/2004 |
| KR | 20040062802 | 7/2004 |
| KR | 20040064855 | 7/2004 |
| KR | 20040066724 | 7/2004 |
| KR | 20040068864 | 8/2004 |
| KR | 20040070840 | 8/2004 |
| KR | 20040076308 | 9/2004 |
| KR | 20040086994 | 10/2004 |
| KR | 20040102386 | 12/2004 |
| KR | 20050008245 | 1/2005 |
| KR | 20050011313 | 1/2005 |
| KR | 20050012505 | 2/2005 |
| KR | 20050014448 | 2/2005 |
| KR | 20050015293 | 2/2005 |
| KR | 20050015526 | 2/2005 |
| KR | 20050015745 | 2/2005 |
| KR | 20050018370 | 2/2005 |
| KR | 20050023950 | 3/2005 |
| KR | 20050028537 | 3/2005 |
| KR | 20050033308 | 4/2005 |
| KR | 101006660 | 9/2005 |
| KR | 1020050095463 | 9/2005 |
| KR | 100547739 | 1/2006 |
| KR | 20060023957 | 3/2006 |
| KR | 1020060019715 | 3/2006 |
| KR | 100645746 | 5/2006 |
| KR | 20060054877 | 5/2006 |
| KR | 100612890 | 8/2006 |
| KR | 100633792 | 10/2006 |
| KR | 100646966 | 11/2006 |
| KR | 20060119077 | 11/2006 |
| KR | 20060119236 | 11/2006 |
| KR | 20060120318 | 11/2006 |
| KR | 20060121595 | 11/2006 |
| KR | 100660125 | 12/2006 |
| KR | 100663528 | 1/2007 |
| KR | 100672377 | 1/2007 |
| KR | 20070002590 | 1/2007 |
| KR | 20070005263 | 1/2007 |
| KR | 20070005553 | 1/2007 |
| KR | 20070009380 | 1/2007 |
| KR | 100677913 | 2/2007 |
| KR | 100689465 | 3/2007 |
| KR | 20070028201 | 3/2007 |
| KR | 100722974 | 5/2007 |
| KR | 100729813 | 6/2007 |
| KR | 20070067650 | 6/2007 |
| KR | 100743171 | 7/2007 |
| KR | 100743254 | 7/2007 |
| KR | 20070068501 | 7/2007 |
| KR | 20070078477 | 8/2007 |
| KR | 20070082960 | 8/2007 |
| KR | 20070087513 | 8/2007 |
| KR | 20070091486 | 9/2007 |

(56) References Cited

FOREIGN PATENT DOCUMENTS

| | | |
|---|---|---|
| KR | 100766953 | 10/2007 |
| KR | 100771364 | 10/2007 |
| KR | 20070104957 | 10/2007 |
| KR | 100777428 | 11/2007 |
| KR | 20070115754 | 12/2007 |
| KR | 20070122344 | 12/2007 |
| KR | 20070122345 | 12/2007 |
| KR | 100802525 | 2/2008 |
| KR | 20080013314 | 2/2008 |
| KR | 20080015099 | 2/2008 |
| KR | 20080015100 | 2/2008 |
| KR | 20080015973 | 2/2008 |
| KR | 20080018407 | 2/2008 |
| KR | 100822053 | 4/2008 |
| KR | 20080045551 | 5/2008 |
| KR | 100841243 | 6/2008 |
| KR | 20080053057 | 6/2008 |
| KR | 20080054596 | 6/2008 |
| KR | 100846192 | 7/2008 |
| KR | 20080059882 | 7/2008 |
| KR | 20080069007 | 7/2008 |
| KR | 100854932 | 8/2008 |
| KR | 20080071070 | 8/2008 |
| KR | 20080078315 | 8/2008 |
| KR | 100866177 | 10/2008 |
| KR | 100866475 | 11/2008 |
| KR | 100866476 | 11/2008 |
| KR | 100866573 | 11/2008 |
| KR | 100870724 | 11/2008 |
| KR | 20080096918 | 11/2008 |
| KR | 20080098409 | 11/2008 |
| KR | 100871916 | 12/2008 |
| KR | 20080112331 | 12/2008 |
| KR | 20090003899 | 1/2009 |
| KR | 20090018486 | 2/2009 |
| KR | 20090020864 | 2/2009 |
| KR | 100888554 | 3/2009 |
| KR | 20090036734 | 4/2009 |
| KR | 100897170 | 5/2009 |
| KR | 20090052526 | 5/2009 |
| KR | 100901784 | 6/2009 |
| KR | 100903348 | 6/2009 |
| KR | 20090089931 | 8/2009 |
| KR | 100922497 | 10/2009 |
| KR | 20090105424 | 10/2009 |
| KR | 100932752 | 12/2009 |
| KR | 100935495 | 1/2010 |
| KR | 20100006652 | 1/2010 |
| KR | 2010022327 | 3/2010 |
| KR | 20100039170 | 4/2010 |
| KR | 100958030 | 5/2010 |
| KR | 20100059681 | 6/2010 |
| KR | 20100070116 | 6/2010 |
| KR | 20100070119 | 6/2010 |
| KR | 20100072994 | 7/2010 |
| KR | 100977516 | 8/2010 |
| KR | 2010091758 | 8/2010 |
| KR | 20100089125 | 8/2010 |
| KR | 20100090521 | 8/2010 |
| KR | 20100091758 | 8/2010 |
| KR | 20100098958 | 9/2010 |
| KR | 100985816 | 10/2010 |
| KR | 100990904 | 11/2010 |
| KR | 20100123021 | 11/2010 |
| KR | 1006660 | 1/2011 |
| KR | 20110006437 | 1/2011 |
| KR | 20110011264 | 2/2011 |
| KR | 2011019994 | 3/2011 |
| KR | 2011024290 | 3/2011 |
| KR | 101111167 | 4/2011 |
| KR | 1111167 | 2/2012 |
| KR | 1020130142810 | 12/2013 |
| TW | 201116030 | 5/2011 |
| WO | WO 00/23814 | 4/2000 |
| WO | WO 02/067575 | 8/2002 |
| WO | WO 03/093963 | 11/2003 |
| WO | WO 2005/002228 | 1/2005 |
| WO | WO 2005/088846 | 9/2005 |
| WO | WO 2006/112866 | 10/2006 |
| WO | WO 2007/006242 | 1/2007 |
| WO | WO 2008/094102 | 8/2008 |
| WO | WO 2009/122114 | 10/2009 |
| WO | WO 2010/005152 | 1/2010 |
| WO | WO 2010/033142 | 3/2010 |
| WO | WO 2011131758 | 10/2011 |
| WO | WO 2012027739 | 3/2012 |
| WO | WO 2012/170949 | 12/2012 |
| WO | WO 2012/170953 | 12/2012 |
| WO | WO 2012170946 | 12/2012 |

OTHER PUBLICATIONS

Neto et al., "Figures of merit and optimization of a $VO_2$ microbolometer with strong electrothermal feedback", SPIE, Jul. 1, 2008, pp. 1-15, vol. 47, No. 7, Bellingham, WA.

Tzimopoulou et al., "Scene based techniques for nonuniformity correction of infrared focal plane arrays", Proceedings of SPIE, Jul. 19, 1998, pp. 172-183, vol. 3436, International Society for Optical Engineering, US.

Perry, Greg, "Counters and Accumulators", Absolute Beginner's Guide to Programming, Apr. 2001, 4 pages, Second Edition, QUE, Safari Books, [online], [retrieved on May 19, 2014]. Retrieved from the Internet: <URL:http://techbus.safaribooksonline.com/print?xmlid=0-7897-2529-0%2Fcopyrightpg>.

FLIR, "FLIR P640 Infrared Camera", Jan. 23, 2010, pp. 1-2 http://www.flir.com/uploadedFiles/Thermography_APAC/Products/Product_Literature/AU_P640_Datasheet_APAD.pdf.

DARPA, "Broad Agency Announcement Low Cost Thermal Imager Manufacturing (LCTI-M)", Microsystems Technology Office, DARPA-BAA-11-27, Jan. 24, 2011. pp. 1-42, Arlington, VA.

* cited by examiner

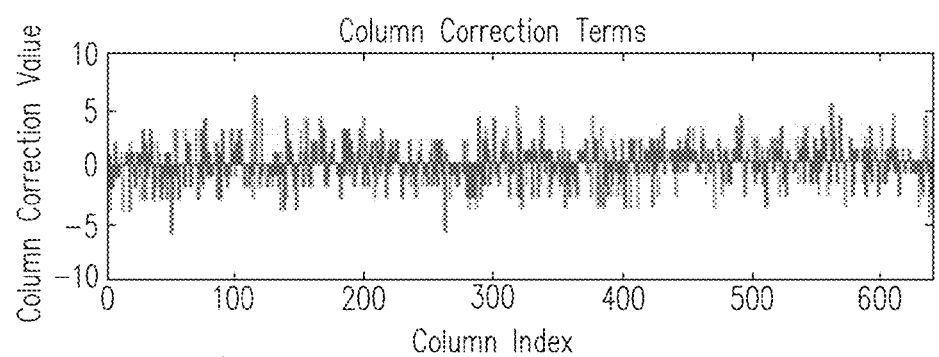
FIG. 16A

THERMAL IMAGE FRAME CAPTURE USING DE-ALIGNED SENSOR ARRAY

CROSS-REFERENCE TO RELATED APPLICATIONS

This patent application claims priority to and the benefit of U.S. Provisional Patent Application No. 61/646,781 filed May 14, 2012 and entitled "THERMAL IMAGE FRAME CAPTURE USING DE-ALIGNED SENSOR ARRAY," which is incorporated herein by reference in its entirety.

This patent application is a continuation-in-part of International Patent Application No. PCT/US2012/041744 filed Jun. 8, 2012 and entitled "LOW POWER AND SMALL FORM FACTOR INFRARED IMAGING," which is incorporated herein by reference in its entirety.

International Patent Application No. PCT/US2012/041744 claims priority to and the benefit of U.S. Provisional Patent Application No. 61/656,889 filed Jun. 7, 2012 and entitled "LOW POWER AND SMALL FORM FACTOR INFRARED IMAGING," which are incorporated herein by reference in their entirety.

International Patent Application No. PCT/US2012/041744 claims priority to and the benefit of U.S. Provisional Patent Application No. 61/545,056 filed Oct. 7, 2011 and entitled "NON-UNIFORMITY CORRECTION TECHNIQUES FOR INFRARED IMAGING DEVICES," which are incorporated herein by reference in their entirety.

International Patent Application No. PCT/US2012/041744 claims priority to and the benefit of U.S. Provisional Patent Application No. 61/495,873 filed Jun. 10, 2011 and entitled "INFRARED CAMERA PACKAGING SYSTEMS AND METHODS," which are incorporated herein by reference in their entirety.

International Patent Application No. PCT/US2012/041744 claims priority to and the benefit of U.S. Provisional Patent Application No. 61/495,879 filed Jun. 10, 2011 and entitled "INFRARED CAMERA SYSTEM ARCHITECTURES," which are incorporated herein by reference in their entirety.

International Patent Application No. PCT/US2012/041744 claims priority to and the benefit of U.S. Provisional Patent Application No. 61/495,888 filed Jun. 10, 2011 and entitled "INFRARED CAMERA CALIBRATION TECHNIQUES," which are incorporated herein by reference in their entirety.

This patent application is a continuation-in-part of International Patent Application No. PCT/US2012/041749 filed Jun. 8, 2012 and entitled "NON-UNIFORMITY CORRECTION TECHNIQUES FOR INFRARED IMAGING DEVICES," which is incorporated herein by reference in its entirety.

International Patent Application No. PCT/US2012/041749 claims priority to and the benefit of U.S. Provisional Patent Application No. 61/545,056 filed Oct. 7, 2011 and entitled "NON-UNIFORMITY CORRECTION TECHNIQUES FOR INFRARED IMAGING DEVICES," which are incorporated herein by reference in their entirety.

International Patent Application No. PCT/US2012/041749 claims priority to and the benefit of U.S. Provisional Patent Application No. 61/495,873 filed Jun. 10, 2011 and entitled "INFRARED CAMERA PACKAGING SYSTEMS AND METHODS," which are incorporated herein by reference in their entirety.

International Patent Application No. PCT/US2012/041749 claims priority to and the benefit of U.S. Provisional Patent Application No. 61/495,879 filed Jun. 10, 2011 and entitled "INFRARED CAMERA SYSTEM ARCHITECTURES," which are incorporated herein by reference in their entirety.

International Patent Application No. PCT/US2012/041749 claims priority to and the benefit of U.S. Provisional Patent Application No. 61/495,888 filed Jun. 10, 2011 and entitled "INFRARED CAMERA CALIBRATION TECHNIQUES," which are incorporated herein by reference in their entirety.

This patent application is a continuation-in-part of International Patent Application No. PCT/US2012/041739 filed Jun. 8, 2012 and entitled "INFRARED CAMERA SYSTEM ARCHITECTURES," which is hereby incorporated by reference in its entirety.

International Patent Application No. PCT/US2012/041739 claims priority to and the benefit of U.S. Provisional Patent Application No. 61/495,873 filed Jun. 10, 2011 and entitled "INFRARED CAMERA PACKAGING SYSTEMS AND METHODS," which are incorporated herein by reference in their entirety.

International Patent Application No. PCT/US2012/041739 claims priority to and the benefit of U.S. Provisional Patent Application No. 61/495,879 filed Jun. 10, 2011 and entitled "INFRARED CAMERA SYSTEM ARCHITECTURES," which are incorporated herein by reference in their entirety.

International Patent Application No. PCT/US2012/041739 claims priority to and the benefit of U.S. Provisional Patent Application No. 61/495,888 filed Jun. 10, 2011 and entitled "INFRARED CAMERA CALIBRATION TECHNIQUES," which are incorporated herein by reference in their entirety.

This patent application is a continuation-in-part of U.S. patent application Ser. No. 13/622,178 filed Sep. 18, 2012 and entitled "SYSTEMS AND METHODS FOR PROCESSING INFRARED IMAGES," which is a continuation-in-part of U.S. patent application Ser. No. 13/529,772 filed Jun. 21, 2012 and entitled "SYSTEMS AND METHODS FOR PROCESSING INFRARED IMAGES," which is a continuation of U.S. patent application Ser. No. 12/396,340 filed Mar. 2, 2009 and entitled "SYSTEMS AND METHODS FOR PROCESSING INFRARED IMAGES," which are incorporated herein by reference in their entirety.

TECHNICAL FIELD

One or more embodiments of the invention relate generally to thermal imaging devices and more particularly, for example, to the alignment of infrared sensors used to capture thermal image frames.

BACKGROUND

Conventional infrared imaging devices often use arrays of infrared sensors to capture thermal images of scenes. The infrared sensors are typically implemented in rows and columns to provide generally square or rectangular arrays. Such arrays are usually positioned within imaging devices such that, when the imaging devices are positioned to capture an image of a scene, the rows of sensors are oriented substantially parallel to the ground, and the columns of sensors are oriented substantially perpendicular to the ground.

In many environments, various features of a scene may be disposed in substantially horizontal and/or substantially vertical directions (e.g., relative to the ground or another reference plane). This is true for many manmade structures such as buildings, streets, sidewalks, and other structures. Many naturally occurring features are similarly disposed such as trees, rivers, other bodies of water, and other features. As a result, the horizontal and vertical features of an imaged scene may generally align with the rows and columns of the sensor arrays of conventional infrared imaging devices.

Sensor arrays may exhibit various types of noise (e.g., fixed pattern noise (FPN) or others) that may be substantially correlated to rows and/or columns of infrared sensors. For example, some FPN that appears as column noise may be caused by variations in column amplifiers which may inhibit the ability to distinguish between desired vertical features of a scene and vertical FPN.

Existing techniques used to reduce row and column noise can lead to unsatisfactory results. For example, existing noise reduction techniques may leave artifacts (e.g., image distortion or residual noise) in rows and columns of pixels of captured images. Such row and column noise artifacts may be exacerbated when features of an imaged scene are substantially aligned with rows and columns of the imager as is the case with conventionally oriented sensor arrays.

SUMMARY

In various embodiments, an infrared imaging system may be implemented with an infrared sensor array that is fixably positioned to substantially de-align rows and columns of infrared sensors while a thermal image frame is captured of a scene. In one embodiment, an infrared imaging system includes an infrared sensor array comprising a plurality of infrared sensors arranged in rows and columns and adapted to capture a thermal image frame of a scene exhibiting at least one substantially horizontal or substantially vertical feature; a housing; and wherein the infrared sensor array is fixably positioned within the housing to substantially de-align the rows and columns from the feature while the thermal image frame is captured.

In another embodiment, an infrared imaging system includes an infrared sensor array comprising a plurality of infrared sensors arranged in rows and columns and adapted to capture a thermal image frame of a scene exhibiting at least one substantially horizontal or substantially vertical feature; a housing comprising a surface substantially parallel to the feature; and wherein the infrared sensor array is fixably positioned within the housing to substantially de-align the rows and columns from the surface while the thermal image frame is captured.

In another embodiment, a method includes capturing a thermal image frame of a scene exhibiting at least one substantially horizontal or substantially vertical feature; wherein the capturing is performed by an infrared sensor array comprising a plurality of infrared sensors arranged in rows and columns; and wherein the infrared sensor array is fixably positioned within a housing of an infrared imaging system to substantially de-align the rows and columns from the feature while the thermal image frame is captured.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 16A to 16C show an exemplary implementation of column and row noise filtering for an infrared image, in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
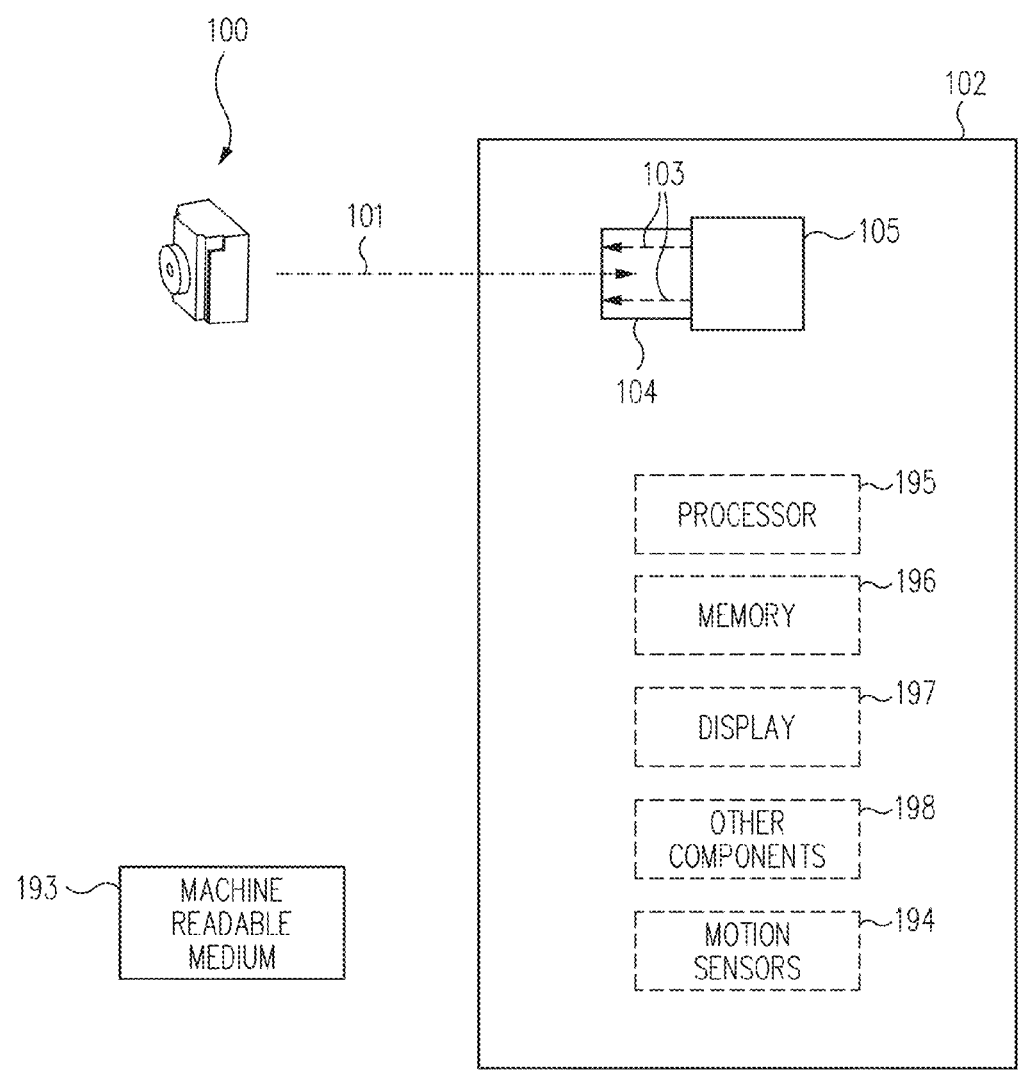
FIG. 1 illustrates an infrared imaging module configured to be implemented in a host device in accordance with an embodiment of the disclosure.

FIG. 1 illustrates an infrared imaging module 100 (e.g., an infrared camera or an infrared imaging device) configured to be implemented in a host device 102 in accordance with an embodiment of the disclosure. Infrared imaging module 100 may be implemented, for one or more embodiments, with a small form factor and in accordance with wafer level packaging techniques or other packaging techniques.

In one embodiment, infrared imaging module 100 may be configured to be implemented in a small portable host device 102, such as a mobile telephone, a tablet computing device, a laptop computing device, a personal digital assistant, a visible light camera, a music player, or any other appropriate mobile device. In this regard, infrared imaging module 100 may be used to provide infrared imaging features to host device 102. For example, infrared imaging module 100 may be configured to capture, process, and/or otherwise manage infrared images and provide such infrared images to host device 102 for use in any desired fashion (e.g., for further processing, to store in memory, to display, to use by various applications running on host device 102, to export to other devices, or other uses).

In various embodiments, infrared imaging module 100 may be configured to operate at low voltage levels and over a wide temperature range. For example, in one embodiment, infrared imaging module 100 may operate using a power supply of approximately 2.4 volts, 2.5 volts, 2.8 volts, or lower voltages, and operate over a temperature range of approximately −20 degrees C. to approximately +60 degrees C. (e.g., providing a suitable dynamic range and performance over an environmental temperature range of approximately 80 degrees C.). In one embodiment, by operating infrared imaging module 100 at low voltage levels, infrared imaging module 100 may experience reduced amounts of self heating in comparison with other types of infrared imaging devices. As a result, infrared imaging module 100 may be operated with reduced measures to compensate for such self heating.

Figure 2:
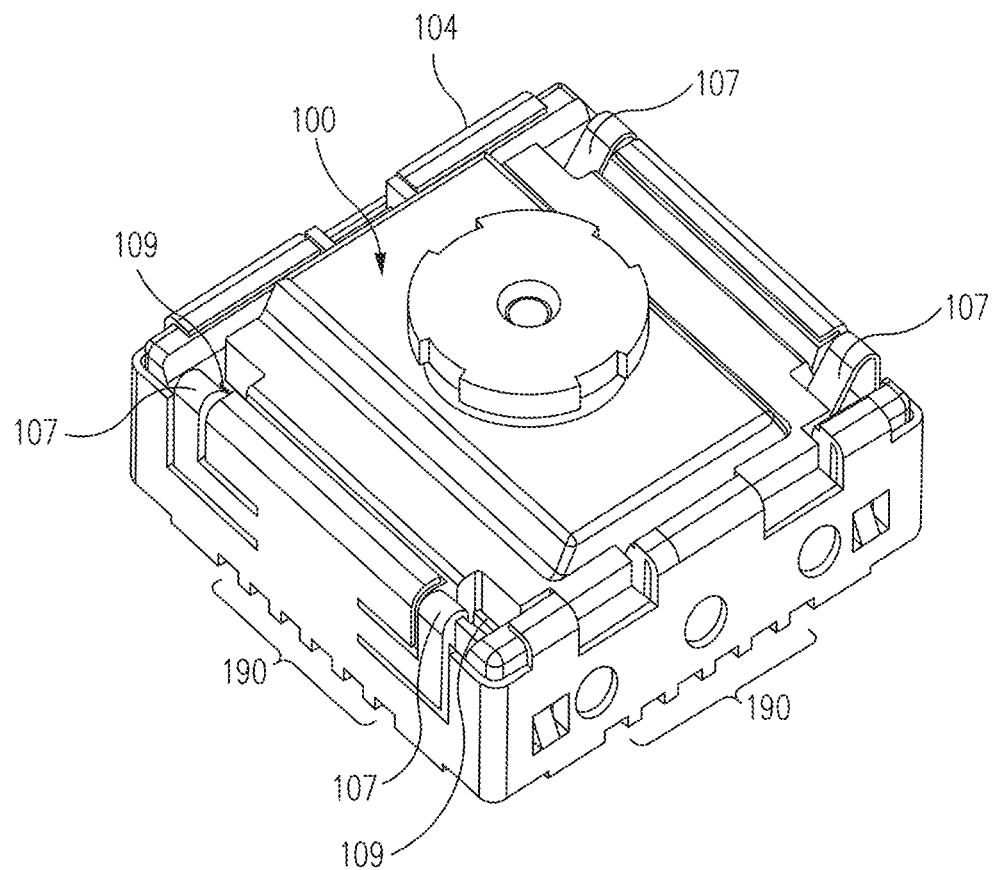
FIG. 2 illustrates an assembled infrared imaging module in accordance with an embodiment of the disclosure.

As shown in FIG. 1, host device 102 may include a socket 104, a shutter 105, motion sensors 194, a processor 195, a memory 196, a display 197, and/or other components 198. Socket 104 may be configured to receive infrared imaging module 100 as identified by arrow 101. In this regard, FIG. 2 illustrates infrared imaging module 100 assembled in socket 104 in accordance with an embodiment of the disclosure.

Motion sensors 194 may be implemented by one or more accelerometers, gyroscopes, or other appropriate devices that may be used to detect movement of host device 102. Motion sensors 194 may be monitored by and provide information to processing module 160 or processor 195 to detect motion. In various embodiments, motion sensors 194 may be implemented as part of host device 102 (as shown in FIG. 1), infrared imaging module 100, or other devices attached to or otherwise interfaced with host device 102.

Processor 195 may be implemented as any appropriate processing device (e.g., logic device, microcontroller, processor, application specific integrated circuit (ASIC), or other device) that may be used by host device 102 to execute appropriate instructions, such as software instructions provided in memory 196. Display 197 may be used to display captured and/or processed infrared images and/or other images, data, and information. Other components 198 may be used to implement any features of host device 102 as may be desired for various applications (e.g., clocks, temperature sensors, a visible light camera, or other components). In addition, a machine readable medium 193 may be provided for storing non-transitory instructions for loading into memory 196 and execution by processor 195.

In various embodiments, infrared imaging module 100 and socket 104 may be implemented for mass production to facilitate high volume applications, such as for implementation in mobile telephones or other devices (e.g., requiring small form factors). In one embodiment, the combination of infrared imaging module 100 and socket 104 may exhibit overall dimensions of approximately 8.5 mm by 8.5 mm by 5.9 mm while infrared imaging module 100 is installed in socket 104.

Figure 3:
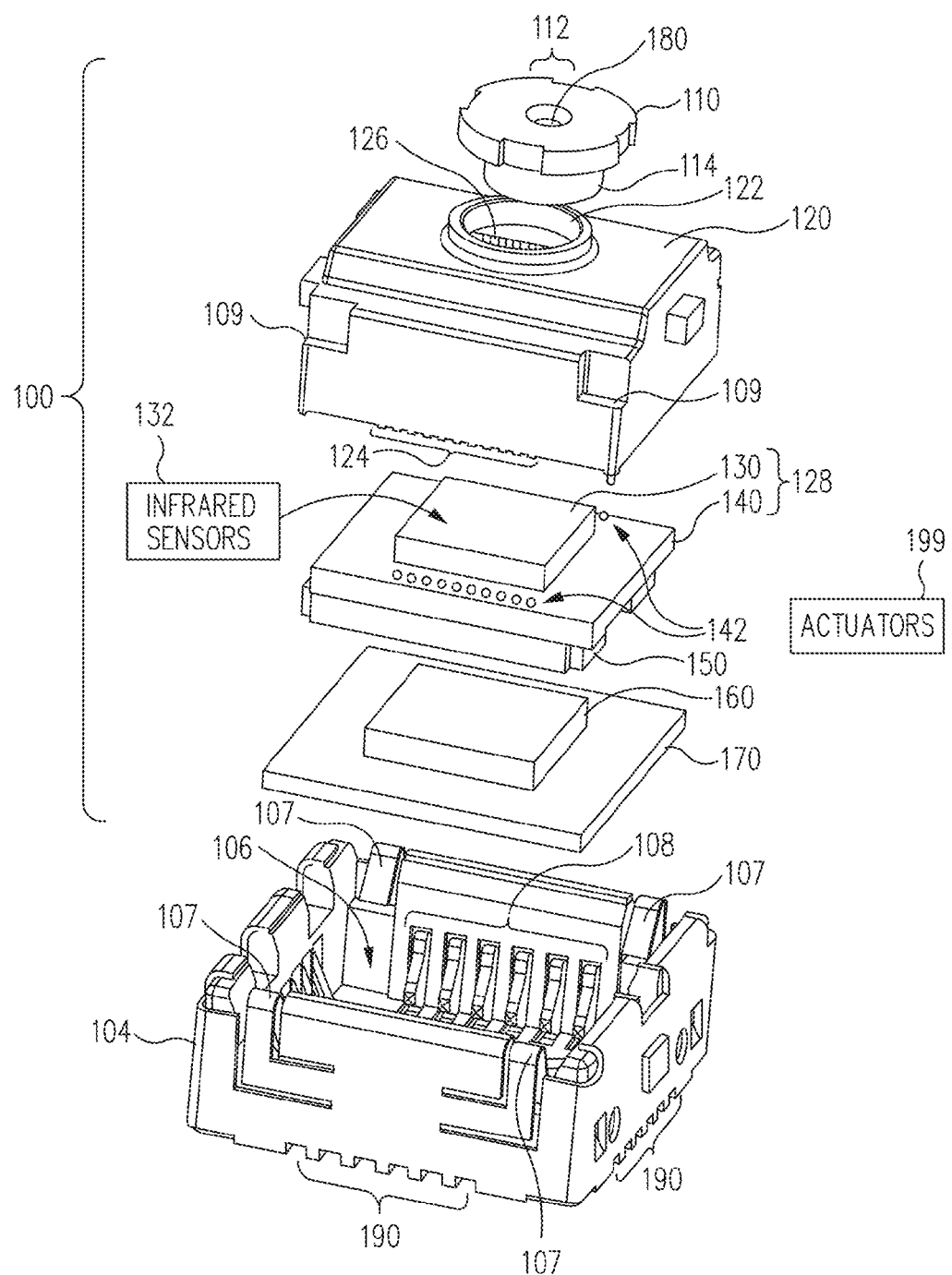
FIG. 3 illustrates an exploded view of an infrared imaging module juxtaposed over a socket in accordance with an embodiment of the disclosure.

FIG. 3 illustrates an exploded view of infrared imaging module 100 juxtaposed over socket 104 in accordance with an embodiment of the disclosure. Infrared imaging module 100 may include a lens barrel 110, a housing 120, an infrared sensor assembly 128, a circuit board 170, a base 150, and a processing module 160.

Lens barrel 110 may at least partially enclose an optical element 180 (e.g., a lens) which is partially visible in FIG. 3 through an aperture 112 in lens barrel 110. Lens barrel 110 may include a substantially cylindrical extension 114 which may be used to interface lens barrel 110 with an aperture 122 in housing 120.

Infrared sensor assembly 128 may be implemented, for example, with a cap 130 (e.g., a lid) mounted on a substrate 140. Infrared sensor assembly 128 may include a plurality of infrared sensors 132 (e.g., infrared detectors) implemented in an array or other fashion on substrate 140 and covered by cap 130. For example, in one embodiment, infrared sensor assembly 128 may be implemented as a focal plane array (FPA). Such a focal plane array may be implemented, for example, as a vacuum package assembly (e.g., sealed by cap 130 and substrate 140). In one embodiment, infrared sensor assembly 128 may be implemented as a wafer level package (e.g., infrared sensor assembly 128 may be singulated from a set of vacuum package assemblies provided on a wafer). In one embodiment, infrared sensor assembly 128 may be implemented to operate using a power supply of approximately 2.4 volts, 2.5 volts, 2.8 volts, or similar voltages.

Infrared sensors 132 may be configured to detect infrared radiation (e.g., infrared energy) from a target scene including, for example, mid wave infrared wave bands (MWIR), long wave infrared wave bands (LWIR), and/or other thermal imaging bands as may be desired in particular implementations. In one embodiment, infrared sensor assembly 128 may be provided in accordance with wafer level packaging techniques.

Infrared sensors 132 may be implemented, for example, as microbolometers or other types of thermal imaging infrared sensors arranged in any desired array pattern to provide a plurality of pixels. In one embodiment, infrared sensors 132 may be implemented as vanadium oxide (VOx) detectors with a 17 μm pixel pitch. In various embodiments, arrays of approximately 32 by 32 infrared sensors 132, approximately 64 by 64 infrared sensors 132, approximately 80 by 64 infrared sensors 132, or other array sizes may be used.

Substrate 140 may include various circuitry including, for example, a read out integrated circuit (ROIC) with dimensions less than approximately 5.5 mm by 5.5 mm in one embodiment. Substrate 140 may also include bond pads 142 that may be used to contact complementary connections positioned on inside surfaces of housing 120 when infrared imaging module 100 is assembled as shown in FIGS. 5A, 5B, and 5C. In one embodiment, the ROIC may be implemented with low-dropout regulators (LDO) to perform voltage regulation to reduce power supply noise introduced to infrared sensor assembly 128 and thus provide an improved power supply rejection ratio (PSRR). Moreover, by implementing the LDO with the ROIC (e.g., within a wafer level package), less die area may be consumed and fewer discrete die (or chips) are needed.

Figure 4:
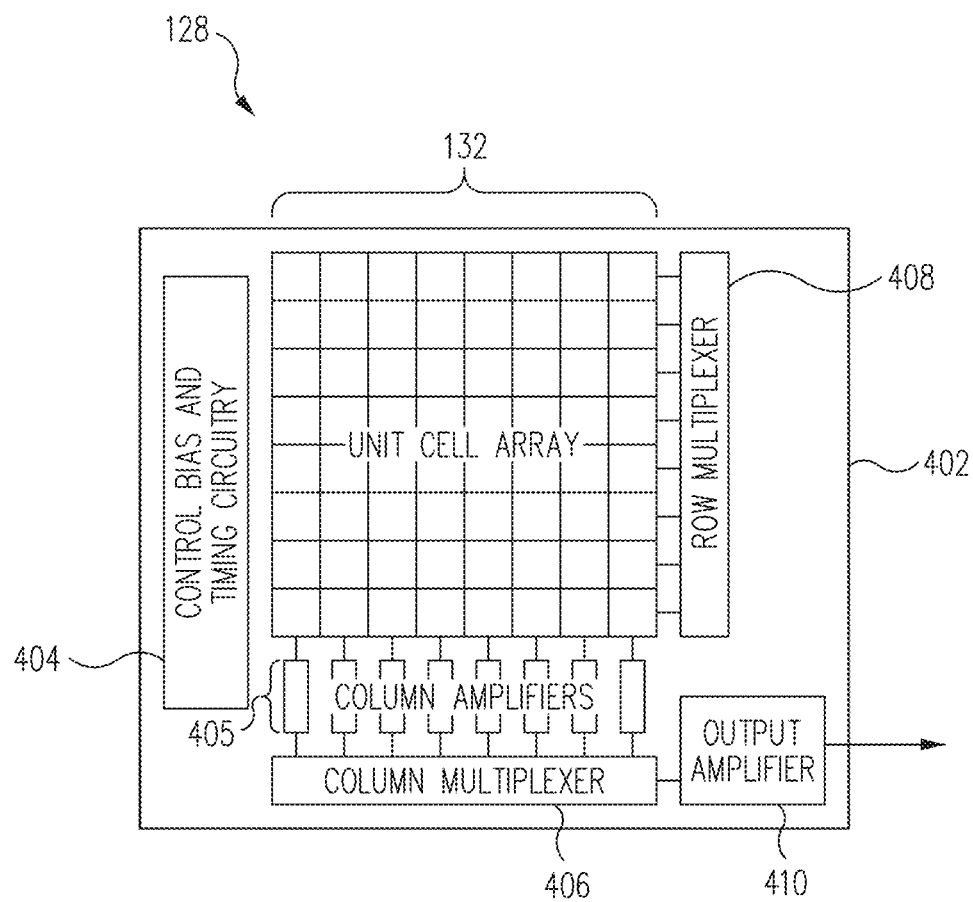
FIG. 4 illustrates a block diagram of an infrared sensor assembly including an array of infrared sensors in accordance with an embodiment of the disclosure.

FIG. 4 illustrates a block diagram of infrared sensor assembly 128 including an array of infrared sensors 132 in accordance with an embodiment of the disclosure. In the illustrated embodiment, infrared sensors 132 are provided as part of a unit cell array of a ROIC 402. ROIC 402 includes bias generation and timing control circuitry 404, column amplifiers 405, a column multiplexer 406, a row multiplexer 408, and an output amplifier 410. Image frames (e.g., thermal images) captured by infrared sensors 132 may be provided by output amplifier 410 to processing module 160, processor 195, and/or any other appropriate components to perform various processing techniques described herein. Although an 8 by 8 array is shown in FIG. 4, any desired array configuration may be used in other embodiments. Further descriptions of ROICs and infrared sensors (e.g., microbolometer circuits) may be found in U.S. Pat. No. 6,028,309 issued Feb. 22, 2000, which is incorporated herein by reference in its entirety.

Infrared sensor assembly 128 may capture images (e.g., image frames) and provide such images from its ROIC at various rates. Processing module 160 may be used to perform appropriate processing of captured infrared images and may be implemented in accordance with any appropriate architecture. In one embodiment, processing module 160 may be implemented as an ASIC. In this regard, such an ASIC may be configured to perform image processing with high performance and/or high efficiency. In another embodiment, processing module 160 may be implemented with a general purpose central processing unit (CPU) which may be configured to execute appropriate software instructions to perform image processing, coordinate and perform image processing with various image processing blocks, coordinate interfacing between processing module 160 and host device 102, and/or other operations. In yet another embodiment, processing module 160 may be implemented with a field programmable gate array (FPGA). Processing module 160 may be implemented with other types of processing and/or logic circuits in other embodiments as would be understood by one skilled in the art.

In these and other embodiments, processing module 160 may also be implemented with other components where appropriate, such as, volatile memory, non-volatile memory, and/or one or more interfaces (e.g., infrared detector interfaces, inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces).

In some embodiments, infrared imaging module 100 may further include one or more actuators 199 which may be used to adjust the focus of infrared image frames captured by infrared sensor assembly 128. For example, actuators 199 may be used to move optical element 180, infrared sensors 132, and/or other components relative to each other to selectively focus and defocus infrared image frames in accordance with techniques described herein. Actuators 199 may be implemented in accordance with any type of motion-inducing apparatus or mechanism, and may be positioned at any location within or external to infrared imaging module 100 as appropriate for different applications.

When infrared imaging module 100 is assembled, housing 120 may substantially enclose infrared sensor assembly 128, base 150, and processing module 160. Housing 120 may facilitate connection of various components of infrared imaging module 100. For example, in one embodiment, housing 120 may provide electrical connections 126 to connect various components as further described.

Electrical connections 126 (e.g., conductive electrical paths, traces, or other types of connections) may be electrically connected with bond pads 142 when infrared imaging module 100 is assembled. In various embodiments, electrical connections 126 may be embedded in housing 120, provided on inside surfaces of housing 120, and/or otherwise provided by housing 120. Electrical connections 126 may terminate in connections 124 protruding from the bottom surface of housing 120 as shown in FIG. 3. Connections 124 may connect with circuit board 170 when infrared imaging module 100 is assembled (e.g., housing 120 may rest atop circuit board 170 in various embodiments). Processing module 160 may be electrically connected with circuit board 170 through appropriate electrical connections. As a result, infrared sensor assembly 128 may be electrically connected with processing module 160 through, for example, conductive electrical paths provided by: bond pads 142, complementary connections on inside surfaces of housing 120, electrical connections 126 of housing 120, connections 124, and circuit board 170. Advantageously, such an arrangement may be implemented without requiring wire bonds to be provided between infrared sensor assembly 128 and processing module 160.

In various embodiments, electrical connections 126 in housing 120 may be made from any desired material (e.g., copper or any other appropriate conductive material). In one embodiment, electrical connections 126 may aid in dissipating heat from infrared imaging module 100.

Other connections may be used in other embodiments. For example, in one embodiment, sensor assembly 128 may be attached to processing module 160 through a ceramic board that connects to sensor assembly 128 by wire bonds and to processing module 160 by a ball grid array (BGA). In another embodiment, sensor assembly 128 may be mounted directly on a rigid flexible board and electrically connected with wire bonds, and processing module 160 may be mounted and connected to the rigid flexible board with wire bonds or a BGA.

The various implementations of infrared imaging module 100 and host device 102 set forth herein are provided for purposes of example, rather than limitation. In this regard, any of the various techniques described herein may be applied to any infrared camera system, infrared imager, or other device for performing infrared/thermal imaging.

Substrate 140 of infrared sensor assembly 128 may be mounted on base 150. In various embodiments, base 150 (e.g., a pedestal) may be made, for example, of copper formed by metal injection molding (MIM) and provided with a black oxide or nickel-coated finish. In various embodiments, base 150 may be made of any desired material, such as for example zinc, aluminum, or magnesium, as desired for a given application and may be formed by any desired applicable process, such as for example aluminum casting, MIM, or zinc rapid casting, as may be desired for particular applications. In various embodiments, base 150 may be implemented to provide structural support, various circuit paths, thermal heat sink properties, and other features where appropriate. In one embodiment, base 150 may be a multi-layer structure implemented at least in part using ceramic material.

In various embodiments, circuit board 170 may receive housing 120 and thus may physically support the various components of infrared imaging module 100. In various embodiments, circuit board 170 may be implemented as a printed circuit board (e.g., an FR4 circuit board or other types of circuit boards), a rigid or flexible interconnect (e.g., tape or other type of interconnects), a flexible circuit substrate, a flexible plastic substrate, or other appropriate structures. In various embodiments, base 150 may be implemented with the various features and attributes described for circuit board 170, and vice versa.

Socket 104 may include a cavity 106 configured to receive infrared imaging module 100 (e.g., as shown in the assembled view of FIG. 2). Infrared imaging module 100 and/or socket 104 may include appropriate tabs, arms, pins, fasteners, or any other appropriate engagement members which may be used to secure infrared imaging module 100 to or within socket 104 using friction, tension, adhesion, and/or any other appropriate manner. Socket 104 may include engagement members 107 that may engage surfaces 109 of housing 120 when infrared imaging module 100 is inserted into a cavity 106 of socket 104. Other types of engagement members may be used in other embodiments.

Infrared imaging module 100 may be electrically connected with socket 104 through appropriate electrical connections (e.g., contacts, pins, wires, or any other appropriate connections). For example, socket 104 may include electrical connections 108 which may contact corresponding electrical connections of infrared imaging module 100 (e.g., interconnect pads, contacts, or other electrical connections on side or bottom surfaces of circuit board 170, bond pads 142 or other electrical connections on base 150, or other connections). Electrical connections 108 may be made from any desired material (e.g., copper or any other appropriate conductive material). In one embodiment, electrical connections 108 may be mechanically biased to press against electrical connections of infrared imaging module 100 when infrared imaging module 100 is inserted into cavity 106 of socket 104. In one embodiment, electrical connections 108 may at least partially secure infrared imaging module 100 in socket 104. Other types of electrical connections may be used in other embodiments.

Socket 104 may be electrically connected with host device 102 through similar types of electrical connections. For example, in one embodiment, host device 102 may include electrical connections (e.g., soldered connections, snap-in connections, or other connections) that connect with electrical connections 108 passing through apertures 190. In various embodiments, such electrical connections may be made to the sides and/or bottom of socket 104.

Various components of infrared imaging module 100 may be implemented with flip chip technology which may be used to mount components directly to circuit boards without the additional clearances typically needed for wire bond connections. Flip chip connections may be used, as an example, to reduce the overall size of infrared imaging module 100 for use in compact small form factor applications. For example, in one embodiment, processing module 160 may be mounted to circuit board 170 using flip chip connections. For example, infrared imaging module 100 may be implemented with such flip chip configurations.

In various embodiments, infrared imaging module 100 and/or associated components may be implemented in accordance with various techniques (e.g., wafer level packaging techniques) as set forth in U.S. patent application Ser. No. 12/844,124 filed Jul. 27, 2010, and U.S. Provisional Patent Application No. 61/469,651 filed Mar. 30, 2011, which are incorporated herein by reference in their entirety. Furthermore, in accordance with one or more embodiments, infrared imaging module 100 and/or associated components may be implemented, calibrated, tested, and/or used in accordance with various techniques, such as for example as set forth in U.S. Pat. No. 7,470,902 issued Dec. 30, 2008, U.S. Pat. No. 6,028,309 issued Feb. 22, 2000, U.S. Pat. No. 6,812,465 issued Nov. 2, 2004, U.S. Pat. No. 7,034,301 issued Apr. 25, 2006, U.S. Pat. No. 7,679,048 issued Mar. 16, 2010, U.S. Pat. No. 7,470,904 issued Dec. 30, 2008, U.S. patent application Ser. No. 12/202,880 filed Sep. 2, 2008, and U.S. patent application Ser. No. 12/202,896 filed Sep. 2, 2008, which are incorporated herein by reference in their entirety.

Referring again to FIG. 1, in various embodiments, host device 102 may include shutter 105. In this regard, shutter 105 may be selectively positioned over socket 104 (e.g., as identified by arrows 103) while infrared imaging module 100 is installed therein. In this regard, shutter 105 may be used, for example, to protect infrared imaging module 100 when not in use. Shutter 105 may also be used as a temperature reference as part of a calibration process (e.g., a NUC process or other calibration processes) for infrared imaging module 100 as would be understood by one skilled in the art.

In various embodiments, shutter 105 may be made from various materials such as, for example, polymers, glass, aluminum (e.g., painted or anodized) or other materials. In various embodiments, shutter 105 may include one or more coatings to selectively filter electromagnetic radiation and/or adjust various optical properties of shutter 105 (e.g., a uniform blackbody coating or a reflective gold coating).

In another embodiment, shutter 105 may be fixed in place to protect infrared imaging module 100 at all times. In this case, shutter 105 or a portion of shutter 105 may be made from appropriate materials (e.g., polymers or infrared transmitting materials such as silicon, germanium, zinc selenide, or chalcogenide glasses) that do not substantially filter desired infrared wavelengths. In another embodiment, a shutter may be implemented as part of infrared imaging module 100 (e.g., within or as part of a lens barrel or other components of infrared imaging module 100), as would be understood by one skilled in the art.

Alternatively, in another embodiment, a shutter (e.g., shutter 105 or other type of external or internal shutter) need not be provided, but rather a NUC process or other type of calibration may be performed using shutterless techniques. In another embodiment, a NUC process or other type of calibration using shutterless techniques may be performed in combination with shutter-based techniques.

Infrared imaging module 100 and host device 102 may be implemented in accordance with any of the various techniques set forth in U.S. Provisional Patent Application No. 61/495,873 filed Jun. 10, 2011, U.S. Provisional Patent Application No. 61/495,879 filed Jun. 10, 2011, and U.S. Provisional Patent Application No. 61/495,888 filed Jun. 10, 2011, which are incorporated herein by reference in their entirety.

In various embodiments, the components of host device 102 and/or infrared imaging module 100 may be implemented as a local or distributed system with components in communication with each other over wired and/or wireless networks. Accordingly, the various operations identified in this disclosure may be performed by local and/or remote components as may be desired in particular implementations.

Figure 5:
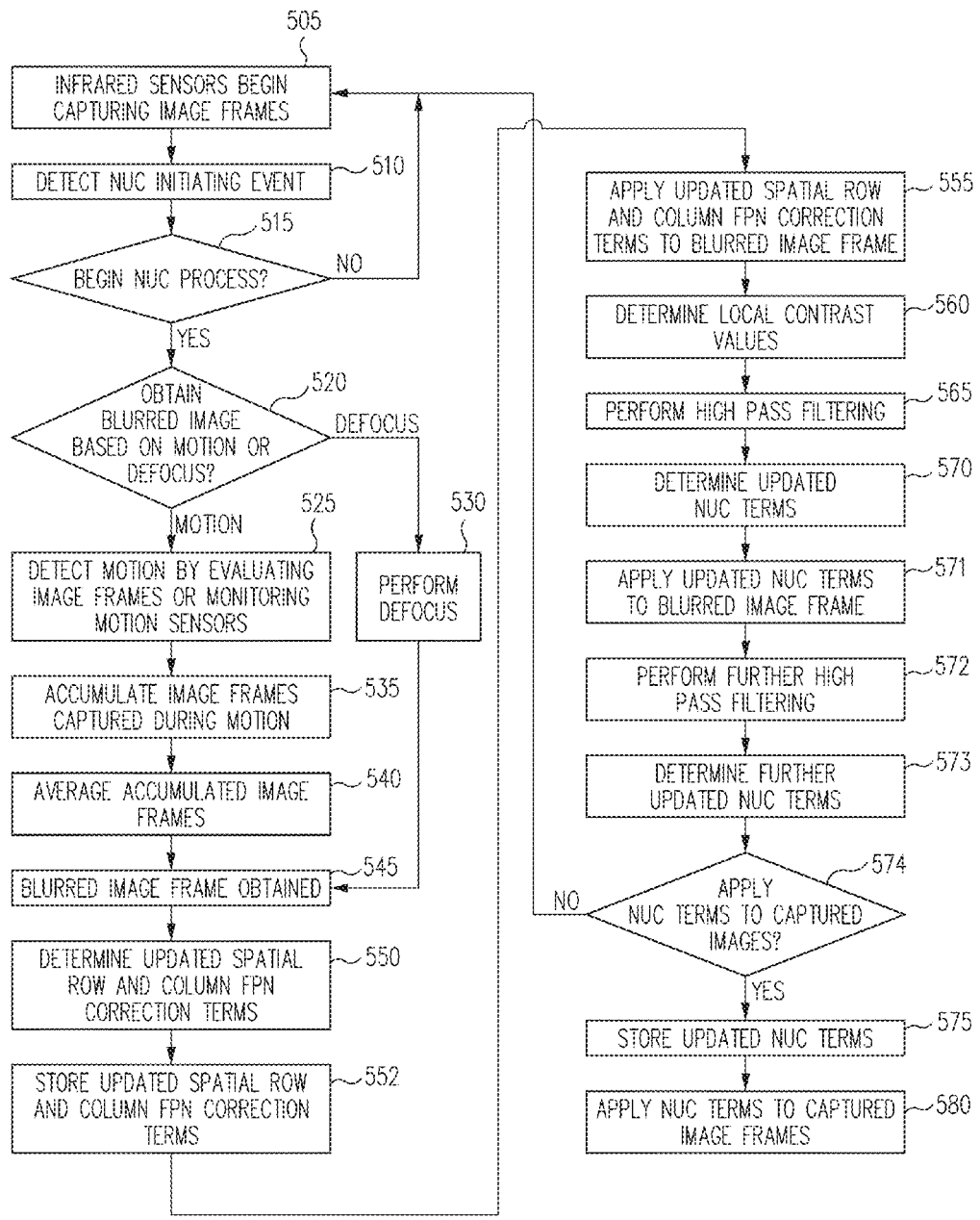
FIG. 5 illustrates a flow diagram of various operations to determine NUC terms in accordance with an embodiment of the disclosure.

FIG. 5 illustrates a flow diagram of various operations to determine NUC terms in accordance with an embodiment of the disclosure. In some embodiments, the operations of FIG. 5 may be performed by processing module 160 or processor 195 (both also generally referred to as a processor) operating on image frames captured by infrared sensors 132.

In block 505, infrared sensors 132 begin capturing image frames of a scene. Typically, the scene will be the real world environment in which host device 102 is currently located. In this regard, shutter 105 (if optionally provided) may be opened to permit infrared imaging module to receive infrared radiation from the scene. Infrared sensors 132 may continue capturing image frames during all operations shown in FIG. 5. In this regard, the continuously captured image frames may be used for various operations as further discussed. In one embodiment, the captured image frames may be temporally filtered (e.g., in accordance with the process of block 826 further described herein with regard to FIG. 8) and be processed by other terms (e.g., factory gain terms 812, factory offset terms 816, previously determined NUC terms 817, column FPN terms 820, and row FPN terms 824 as further described herein with regard to FIG. 8) before they are used in the operations shown in FIG. 5.

In block 510, a NUC process initiating event is detected. In one embodiment, the NUC process may be initiated in response to physical movement of host device 102. Such movement may be detected, for example, by motion sensors 194 which may be polled by a processor. In one example, a user may move host device 102 in a particular manner, such as by intentionally waving host device 102 back and forth in an "erase" or "swipe" movement. In this regard, the user may move host device 102 in accordance with a predetermined speed and direction (velocity), such as in an up and down, side to side, or other pattern to initiate the NUC process. In this example, the use of such movements may permit the user to intuitively operate host device 102 to simulate the "erasing" of noise in captured image frames.

In another example, a NUC process may be initiated by host device 102 if motion exceeding a threshold value is exceeded (e.g., motion greater than expected for ordinary use). It is contemplated that any desired type of spatial translation of host device 102 may be used to initiate the NUC process.

In yet another example, a NUC process may be initiated by host device 102 if a minimum time has elapsed since a previously performed NUC process. In a further example, a NUC process may be initiated by host device 102 if infrared imaging module 100 has experienced a minimum temperature change since a previously performed NUC process. In a still further example, a NUC process may be continuously initiated and repeated.

In block 515, after a NUC process initiating event is detected, it is determined whether the NUC process should actually be performed. In this regard, the NUC process may be selectively initiated based on whether one or more additional conditions are met. For example, in one embodiment, the NUC process may not be performed unless a minimum time has elapsed since a previously performed NUC process. In another embodiment, the NUC process may not be performed unless infrared imaging module 100 has experienced a minimum temperature change since a previously performed NUC process. Other criteria or conditions may be used in other embodiments. If appropriate criteria or conditions have been met, then the flow diagram continues to block 520. Otherwise, the flow diagram returns to block 505.

In the NUC process, blurred image frames may be used to determine NUC terms which may be applied to captured image frames to correct for FPN. As discussed, in one embodiment, the blurred image frames may be obtained by accumulating multiple image frames of a moving scene (e.g., captured while the scene and/or the thermal imager is in motion). In another embodiment, the blurred image frames may be obtained by defocusing an optical element or other component of the thermal imager.

Accordingly, in block 520 a choice of either approach is provided. If the motion-based approach is used, then the flow diagram continues to block 525. If the defocus-based approach is used, then the flow diagram continues to block 530.

Referring now to the motion-based approach, in block 525 motion is detected. For example, in one embodiment, motion may be detected based on the image frames captured by infrared sensors 132. In this regard, an appropriate motion detection process (e.g., an image registration process, a frame-to-frame difference calculation, or other appropriate process) may be applied to captured image frames to determine whether motion is present (e.g., whether static or moving image frames have been captured). For example, in one embodiment, it can be determined whether pixels or regions around the pixels of consecutive image frames have changed more than a user defined amount (e.g., a percentage and/or threshold value). If at least a given percentage of pixels have changed by at least the user defined amount, then motion will be detected with sufficient certainty to proceed to block 535.

In another embodiment, motion may be determined on a per pixel basis, wherein only pixels that exhibit significant changes are accumulated to provide the blurred image frame. For example, counters may be provided for each pixel and used to ensure that the same number of pixel values are accumulated for each pixel, or used to average the pixel values based on the number of pixel values actually accumulated for each pixel. Other types of image-based motion detection may be performed such as performing a Radon transform.

In another embodiment, motion may be detected based on data provided by motion sensors 194. In one embodiment, such motion detection may include detecting whether host device 102 is moving along a relatively straight trajectory through space. For example, if host device 102 is moving along a relatively straight trajectory, then it is possible that certain objects appearing in the imaged scene may not be sufficiently blurred (e.g., objects in the scene that may be aligned with or moving substantially parallel to the straight trajectory). Thus, in such an embodiment, the motion detected by motion sensors 194 may be conditioned on host device 102 exhibiting, or not exhibiting, particular trajectories.

In yet another embodiment, both a motion detection process and motion sensors 194 may be used. Thus, using any of these various embodiments, a determination can be made as to whether or not each image frame was captured while at least a portion of the scene and host device 102 were in motion relative to each other (e.g., which may be caused by host device 102 moving relative to the scene, at least a portion of the scene moving relative to host device 102, or both).

It is expected that the image frames for which motion was detected may exhibit some secondary blurring of the captured scene (e.g., blurred thermal image data associated with the scene) due to the thermal time constants of infrared sensors 132 (e.g., microbolometer thermal time constants) interacting with the scene movement.

In block 535, image frames for which motion was detected are accumulated. For example, if motion is detected for a continuous series of image frames, then the image frames of the series may be accumulated. As another example, if motion is detected for only some image frames, then the non-moving image frames may be skipped and not included in the accumulation. Thus, a continuous or discontinuous set of image frames may be selected to be accumulated based on the detected motion.

In block 540, the accumulated image frames are averaged to provide a blurred image frame. Because the accumulated image frames were captured during motion, it is expected that actual scene information will vary between the image frames and thus cause the scene information to be further blurred in the resulting blurred image frame (block 545).

In contrast, FPN (e.g., caused by one or more components of infrared imaging module 100) will remain fixed over at least short periods of time and over at least limited changes in scene irradiance during motion. As a result, image frames captured in close proximity in time and space during motion will suffer from identical or at least very similar FPN. Thus, although scene information may change in consecutive image frames, the FPN will stay essentially constant. By averaging, multiple image frames captured during motion will blur the scene information, but will not blur the FPN. As a result, FPN will remain more clearly defined in the blurred image frame provided in block 545 than the scene information.

In one embodiment, 32 or more image frames are accumulated and averaged in blocks 535 and 540. However, any desired number of image frames may be used in other embodiments, but with generally decreasing correction accuracy as frame count is decreased.

Referring now to the defocus-based approach, in block 530, a defocus operation may be performed to intentionally defocus the image frames captured by infrared sensors 132. For example, in one embodiment, one or more actuators 199 may be used to adjust, move, or otherwise translate optical element 180, infrared sensor assembly 128, and/or other components of infrared imaging module 100 to cause infrared sensors 132 to capture a blurred (e.g., unfocused) image frame of the scene. Other non-actuator based techniques are also contemplated for intentionally defocusing infrared image frames such as, for example, manual (e.g., user-initiated) defocusing.

Although the scene may appear blurred in the image frame, FPN (e.g., caused by one or more components of infrared imaging module 100) will remain unaffected by the defocusing operation. As a result, a blurred image frame of the scene will be provided (block 545) with FPN remaining more clearly defined in the blurred image than the scene information.

In the above discussion, the defocus-based approach has been described with regard to a single captured image frame. In another embodiment, the defocus-based approach may include accumulating multiple image frames while the infrared imaging module 100 has been defocused and averaging the defocused image frames to remove the effects of temporal noise and provide a blurred image frame in block 545.

Thus, it will be appreciated that a blurred image frame may be provided in block 545 by either the motion-based approach or the defocus-based approach. Because much of the scene information will be blurred by either motion, defocusing, or both, the blurred image frame may be effectively considered a low pass filtered version of the original captured image frames with respect to scene information.

In block 550, the blurred image frame is processed to determine updated row and column FPN terms (e.g., if row and column FPN terms have not been previously determined then the updated row and column FPN terms may be new row and column FPN terms in the first iteration of block 550). As used in this disclosure, the terms row and column may be used interchangeably depending on the orientation of infrared sensors 132 and/or other components of infrared imaging module 100.

In one embodiment, block 550 includes determining a spatial FPN correction term for each row of the blurred image frame (e.g., each row may have its own spatial FPN correction term), and also determining a spatial FPN correction term for each column of the blurred image frame (e.g., each column may have its own spatial FPN correction term). Such processing may be used to reduce the spatial and slowly varying (1/f) row and column FPN inherent in thermal imagers caused by, for example, 1/f noise characteristics of amplifiers in ROIC 402 which may manifest as vertical and horizontal stripes in image frames.

Advantageously, by determining spatial row and column FPN terms using the blurred image frame, there will be a reduced risk of vertical and horizontal objects in the actual imaged scene from being mistaken for row and column noise (e.g., real scene content will be blurred while FPN remains unblurred).

Figure 6:
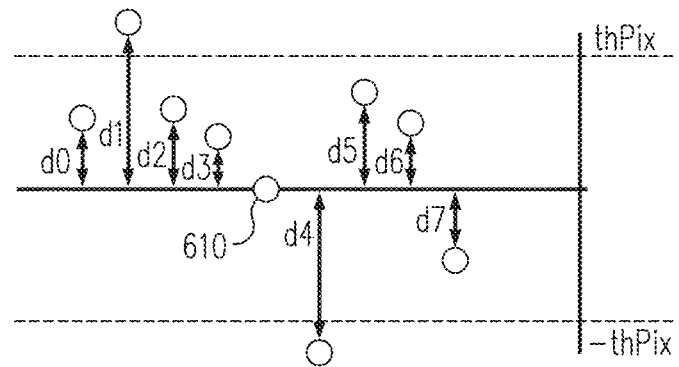
FIG. 6 illustrates differences between neighboring pixels in accordance with an embodiment of the disclosure.

In one embodiment, row and column FPN terms may be determined by considering differences between neighboring pixels of the blurred image frame. For example, FIG. 6 illustrates differences between neighboring pixels in accordance with an embodiment of the disclosure. Specifically, in FIG. 6 a pixel 610 is compared to its 8 nearest horizontal neighbors: d0-d3 on one side and d4-d7 on the other side. Differences between the neighbor pixels can be averaged to obtain an estimate of the offset error of the illustrated group of pixels. An offset error may be calculated for each pixel in a row or column and the average result may be used to correct the entire row or column.

To prevent real scene data from being interpreted as noise, upper and lower threshold values may be used (thPix and −thPix). Pixel values falling outside these threshold values (pixels d1 and d4 in this example) are not used to obtain the offset error. In addition, the maximum amount of row and column FPN correction may be limited by these threshold values.

Further techniques for performing spatial row and column FPN correction processing are set forth in U.S. patent application Ser. No. 12/396,340 filed Mar. 2, 2009 which is incorporated herein by reference in its entirety.

Referring again to FIG. 5, the updated row and column FPN terms determined in block 550 are stored (block 552) and applied (block 555) to the blurred image frame provided in block 545. After these terms are applied, some of the spatial row and column FPN in the blurred image frame may be reduced. However, because such terms are applied generally to rows and columns, additional FPN may remain such as spatially uncorrelated FPN associated with pixel to pixel drift or other causes. Neighborhoods of spatially correlated FPN may also remain which may not be directly associated with individual rows and columns. Accordingly, further processing may be performed as discussed below to determine NUC terms.

In block 560, local contrast values (e.g., edges or absolute values of gradients between adjacent or small groups of pixels) in the blurred image frame are determined. If scene information in the blurred image frame includes contrasting areas that have not been significantly blurred (e.g., high contrast edges in the original scene data), then such features may be identified by a contrast determination process in block 560.

For example, local contrast values in the blurred image frame may be calculated, or any other desired type of edge detection process may be applied to identify certain pixels in the blurred image as being part of an area of local contrast. Pixels that are marked in this manner may be considered as containing excessive high spatial frequency scene information that would be interpreted as FPN (e.g., such regions may correspond to portions of the scene that have not been sufficiently blurred). As such, these pixels may be excluded from being used in the further determination of NUC terms. In one embodiment, such contrast detection processing may rely on a threshold that is higher than the expected contrast value associated with FPN (e.g., pixels exhibiting a contrast value higher than the threshold may be considered to be scene information, and those lower than the threshold may be considered to be exhibiting FPN).

In one embodiment, the contrast determination of block 560 may be performed on the blurred image frame after row and column FPN terms have been applied to the blurred image frame (e.g., as shown in FIG. 5). In another embodiment, block 560 may be performed prior to block 550 to determine contrast before row and column FPN terms are determined (e.g., to prevent scene based contrast from contributing to the determination of such terms).

Following block 560, it is expected that any high spatial frequency content remaining in the blurred image frame may be generally attributed to spatially uncorrelated FPN. In this regard, following block 560, much of the other noise or actual desired scene based information has been removed or excluded from the blurred image frame due to: intentional blurring of the image frame (e.g., by motion or defocusing in blocks 520 through 545), application of row and column FPN terms (block 555), and contrast determination of (block 560).

Thus, it can be expected that following block 560, any remaining high spatial frequency content (e.g., exhibited as areas of contrast or differences in the blurred image frame) may be attributed to spatially uncorrelated FPN. Accordingly, in block 565, the blurred image frame is high pass filtered. In one embodiment, this may include applying a high pass filter to extract the high spatial frequency content from the blurred image frame. In another embodiment, this may include applying a low pass filter to the blurred image frame and taking a difference between the low pass filtered image frame and the unfiltered blurred image frame to obtain the high spatial frequency content. In accordance with various embodiments of the present disclosure, a high pass filter may be implemented by calculating a mean difference between a sensor signal (e.g., a pixel value) and its neighbors.

In block 570, a flat field correction process is performed on the high pass filtered blurred image frame to determine updated NUC terms (e.g., if a NUC process has not previously been performed then the updated NUC terms may be new NUC terms in the first iteration of block 570).

Figure 7:
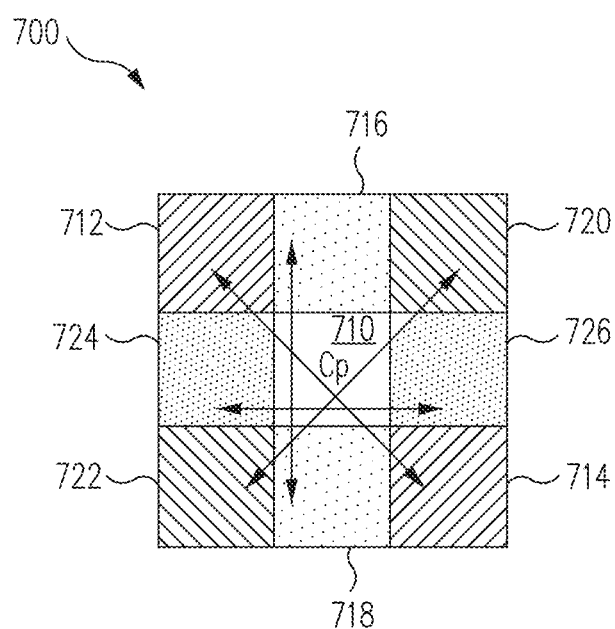
FIG. 7 illustrates a flat field correction technique in accordance with an embodiment of the disclosure.

For example, FIG. 7 illustrates a flat field correction technique 700 in accordance with an embodiment of the disclosure. In FIG. 7, a NUC term may be determined for each pixel 710 of the blurred image frame using the values of its neighboring pixels 712 to 726. For each pixel 710, several gradients may be determined based on the absolute difference between the values of various adjacent pixels. For example, absolute value differences may be determined between: pixels 712 and 714 (a left to right diagonal gradient), pixels 716 and 718 (a top to bottom vertical gradient), pixels 720 and 722 (a right to left diagonal gradient), and pixels 724 and 726 (a left to right horizontal gradient).

These absolute differences may be summed to provide a summed gradient for pixel 710. A weight value may be determined for pixel 710 that is inversely proportional to the summed gradient. This process may be performed for all pixels 710 of the blurred image frame until a weight value is provided for each pixel 710. For areas with low gradients (e.g., areas that are blurry or have low contrast), the weight value will be close to one. Conversely, for areas with high gradients, the weight value will be zero or close to zero. The update to the NUC term as estimated by the high pass filter is multiplied with the weight value.

In one embodiment, the risk of introducing scene information into the NUC terms can be further reduced by applying some amount of temporal damping to the NUC term determination process. For example, a temporal damping factor $\lambda$ between 0 and 1 may be chosen such that the new NUC term ($NUC_{NEW}$) stored is a weighted average of the old NUC term ($NUC_{OLD}$) and the estimated updated NUC term ($NUC_{UPDATE}$). In one embodiment, this can be expressed as $NUC_{NEW}=\lambda \cdot NUC_{OLD}+(1-\lambda)\cdot(NUC_{OLD}+NUC_{UPDATE})$.

Although the determination of NUC terms has been described with regard to gradients, local contrast values may be used instead where appropriate. Other techniques may also be used such as, for example, standard deviation calculations. Other types flat field correction processes may be performed to determine NUC terms including, for example, various processes identified in U.S. Pat. No. 6,028,309 issued Feb. 22, 2000, U.S. Pat. No. 6,812,465 issued Nov. 2, 2004, and U.S. patent application Ser. No. 12/114,865 filed May 5, 2008, which are incorporated herein by reference in their entirety.

Referring again to FIG. 5, block 570 may include additional processing of the NUC terms. For example, in one embodiment, to preserve the scene signal mean, the sum of all NUC terms may be normalized to zero by subtracting the NUC term mean from each NUC term. Also in block 570, to avoid row and column noise from affecting the NUC terms, the mean value of each row and column may be subtracted from the NUC terms for each row and column. As a result, row and column FPN filters using the row and column FPN terms determined in block 550 may be better able to filter out row and column noise in further iterations (e.g., as further shown in FIG. 8) after the NUC terms are applied to captured images (e.g., in block 580 further discussed herein). In this regard, the row and column FPN filters may in general use more data to calculate the per row and per column offset coefficients (e.g., row and column FPN terms) and may thus provide a more robust alternative for reducing spatially correlated FPN than the NUC terms which are based on high pass filtering to capture spatially uncorrelated noise.

In blocks 571-573, additional high pass filtering and further determinations of updated NUC terms may be optionally performed to remove spatially correlated FPN with lower spatial frequency than previously removed by row and column FPN terms. In this regard, some variability in infrared sensors 132 or other components of infrared imaging module 100 may result in spatially correlated FPN noise that cannot be easily modeled as row or column noise. Such spatially correlated FPN may include, for example, window defects on a sensor package or a cluster of infrared sensors 132 that respond differently to irradiance than neighboring infrared sensors 132. In one embodiment, such spatially correlated FPN may be mitigated with an offset correction. If the amount of such spatially correlated FPN is significant, then the noise may also be detectable in the blurred image frame. Since this type of noise may affect a neighborhood of pixels, a high pass filter with a small kernel may not detect the FPN in the neighborhood (e.g., all values used in high pass filter may be taken from the neighborhood of affected pixels and thus may be affected by the same offset error). For example, if the high pass filtering of block 565 is performed with a small kernel (e.g., considering only immediately adjacent pixels that fall within a neighborhood of pixels affected by spatially correlated FPN), then broadly distributed spatially correlated FPN may not be detected.

Figure 11:
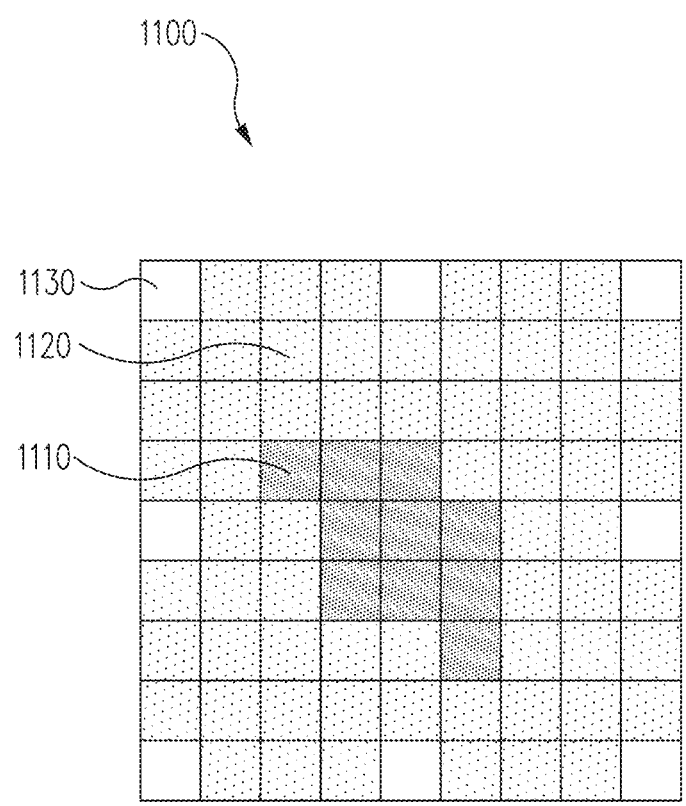
FIG. 11 illustrates spatially correlated FPN in a neighborhood of pixels in accordance with an embodiment of the disclosure.

For example, FIG. 11 illustrates spatially correlated FPN in a neighborhood of pixels in accordance with an embodiment of the disclosure. As shown in a sample image frame 1100, a neighborhood of pixels 1110 may exhibit spatially correlated FPN that is not precisely correlated to individual rows and columns and is distributed over a neighborhood of several pixels (e.g., a neighborhood of approximately 4 by 4 pixels in this example). Sample image frame 1100 also includes a set of pixels 1120 exhibiting substantially uniform response that are not used in filtering calculations, and a set of pixels 1130 that are used to estimate a low pass value for the neighborhood of pixels 1110. In one embodiment, pixels 1130 may be a number of pixels divisible by two in order to facilitate efficient hardware or software calculations.

Referring again to FIG. 5, in blocks 571-573, additional high pass filtering and further determinations of updated NUC terms may be optionally performed to remove spatially correlated FPN such as exhibited by pixels 1110. In block 571, the updated NUC terms determined in block 570 are applied to the blurred image frame. Thus, at this time, the blurred image frame will have been initially corrected for spatially correlated FPN (e.g., by application of the updated row and column FPN terms in block 555), and also initially corrected for spatially uncorrelated FPN (e.g., by application of the updated NUC terms applied in block 571).

In block 572, a further high pass filter is applied with a larger kernel than was used in block 565, and further updated NUC terms may be determined in block 573. For example, to detect the spatially correlated FPN present in pixels 1110, the high pass filter applied in block 572 may include data from a sufficiently large enough neighborhood of pixels such that differences can be determined between unaffected pixels (e.g., pixels 1120) and affected pixels (e.g., pixels 1110). For example, a low pass filter with a large kernel can be used (e.g., an N by N kernel that is much greater than 3 by 3 pixels) and the results may be subtracted to perform appropriate high pass filtering.

In one embodiment, for computational efficiency, a sparse kernel may be used such that only a small number of neighboring pixels inside an N by N neighborhood are used. For any given high pass filter operation using distant neighbors (e.g., a large kernel), there is a risk of modeling actual (potentially blurred) scene information as spatially correlated FPN. Accordingly, in one embodiment, the temporal damping factor λ may be set close to 1 for updated NUC terms determined in block 573.

In various embodiments, blocks 571-573 may be repeated (e.g., cascaded) to iteratively perform high pass filtering with increasing kernel sizes to provide further updated NUC terms further correct for spatially correlated FPN of desired neighborhood sizes. In one embodiment, the decision to perform such iterations may be determined by whether spatially correlated FPN has actually been removed by the updated NUC terms of the previous performance of blocks 571-573.

After blocks 571-573 are finished, a decision is made regarding whether to apply the updated NUC terms to captured image frames (block 574). For example, if an average of the absolute value of the NUC terms for the entire image frame is less than a minimum threshold value, or greater than a maximum threshold value, the NUC terms may be deemed spurious or unlikely to provide meaningful correction. Alternatively, thresholding criteria may be applied to individual pixels to determine which pixels receive updated NUC terms. In one embodiment, the threshold values may correspond to differences between the newly calculated NUC terms and previously calculated NUC terms. In another embodiment, the threshold values may be independent of previously calculated NUC terms. Other tests may be applied (e.g., spatial correlation tests) to determine whether the NUC terms should be applied.

If the NUC terms are deemed spurious or unlikely to provide meaningful correction, then the flow diagram returns to block 505. Otherwise, the newly determined NUC terms are stored (block 575) to replace previous NUC terms (e.g., determined by a previously performed iteration of FIG. 5) and applied (block 580) to captured image frames.

Figure 8:
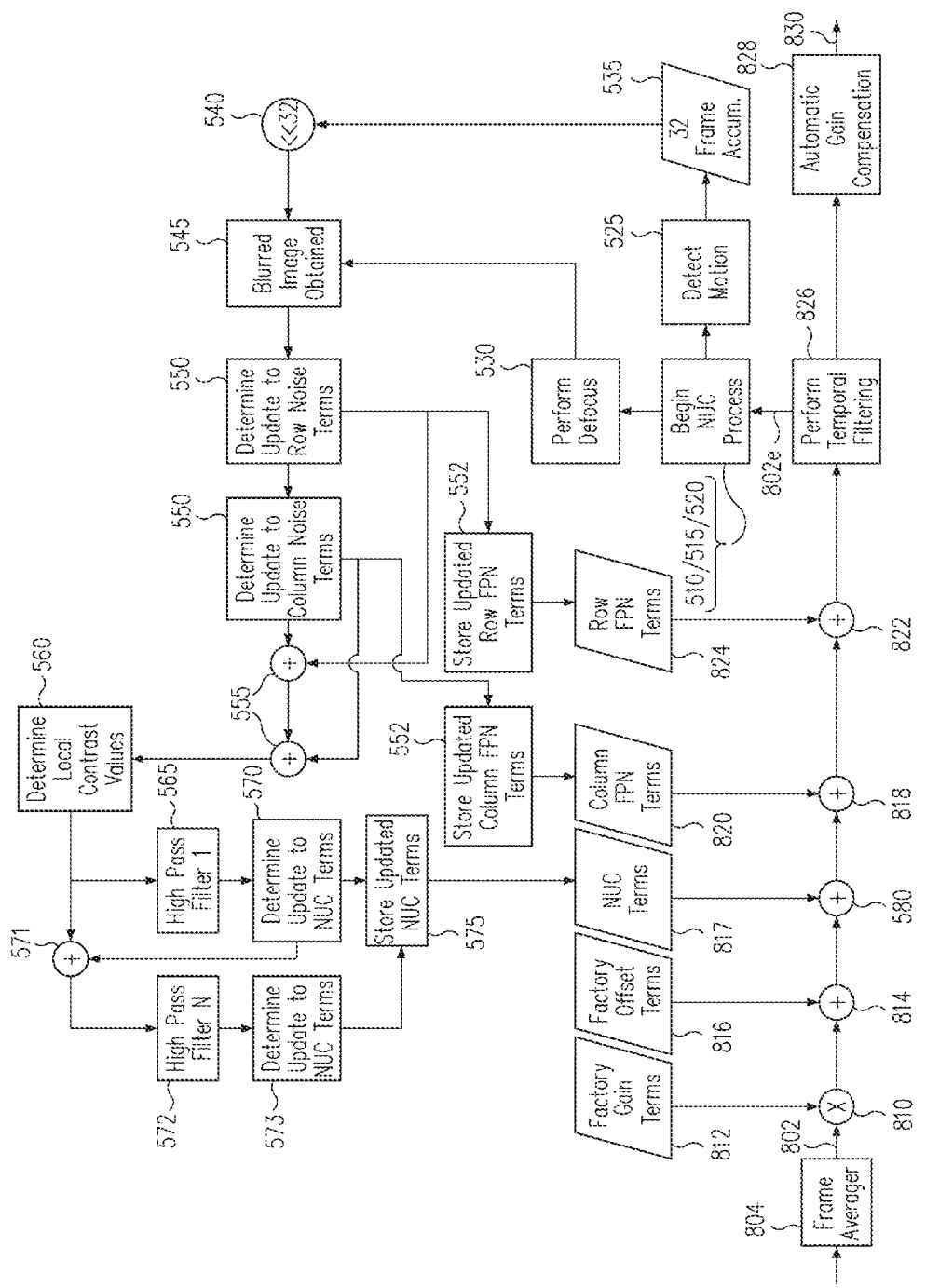
FIG. 8 illustrates various image processing techniques of FIG. 5 and other operations applied in an image processing pipeline in accordance with an embodiment of the disclosure.

FIG. 8 illustrates various image processing techniques of FIG. 5 and other operations applied in an image processing pipeline 800 in accordance with an embodiment of the disclosure. In this regard, pipeline 800 identifies various operations of FIG. 5 in the context of an overall iterative image processing scheme for correcting image frames provided by infrared imaging module 100. In some embodiments, pipeline 800 may be provided by processing module 160 or processor 195 (both also generally referred to as a processor) operating on image frames captured by infrared sensors 132.

Image frames captured by infrared sensors 132 may be provided to a frame averager 804 that integrates multiple image frames to provide image frames 802 with an improved signal to noise ratio. Frame averager 804 may be effectively provided by infrared sensors 132, ROIC 402, and other components of infrared sensor assembly 128 that are implemented to support high image capture rates. For example, in one embodiment, infrared sensor assembly 128 may capture infrared image frames at a frame rate of 240 Hz (e.g., 240 images per second). In this embodiment, such a high frame rate may be implemented, for example, by operating infrared sensor assembly 128 at relatively low voltages (e.g., compatible with mobile telephone voltages) and by using a relatively small array of infrared sensors 132 (e.g., an array of 64 by 64 infrared sensors in one embodiment).

In one embodiment, such infrared image frames may be provided from infrared sensor assembly 128 to processing module 160 at a high frame rate (e.g., 240 Hz or other frame rates). In another embodiment, infrared sensor assembly 128 may integrate over longer time periods, or multiple time periods, to provide integrated (e.g., averaged) infrared image frames to processing module 160 at a lower frame rate (e.g., 30 Hz, 9 Hz, or other frame rates). Further information regarding implementations that may be used to provide high image capture rates may be found in U.S. Provisional Patent Application No. 61/495,879 previously referenced herein.

Image frames 802 proceed through pipeline 800 where they are adjusted by various terms, temporally filtered, used to determine the various adjustment terms, and gain compensated.

In blocks 810 and 814, factory gain terms 812 and factory offset terms 816 are applied to image frames 802 to compensate for gain and offset differences, respectively, between the various infrared sensors 132 and/or other components of infrared imaging module 100 determined during manufacturing and testing.

In block 580, NUC terms 817 are applied to image frames 802 to correct for FPN as discussed. In one embodiment, if NUC terms 817 have not yet been determined (e.g., before a NUC process has been initiated), then block 580 may not be performed or initialization values may be used for NUC terms 817 that result in no alteration to the image data (e.g., offsets for every pixel would be equal to zero).

In blocks 818 and 822, column FPN terms 820 and row FPN terms 824, respectively, are applied to image frames 802. Column FPN terms 820 and row FPN terms 824 may be determined in accordance with block 550 as discussed. In one embodiment, if the column FPN terms 820 and row FPN terms 824 have not yet been determined (e.g., before a NUC process has been initiated), then blocks 818 and 822 may not be performed or initialization values may be used for the column FPN terms 820 and row FPN terms 824 that result in no alteration to the image data (e.g., offsets for every pixel would be equal to zero).

Figure 9:
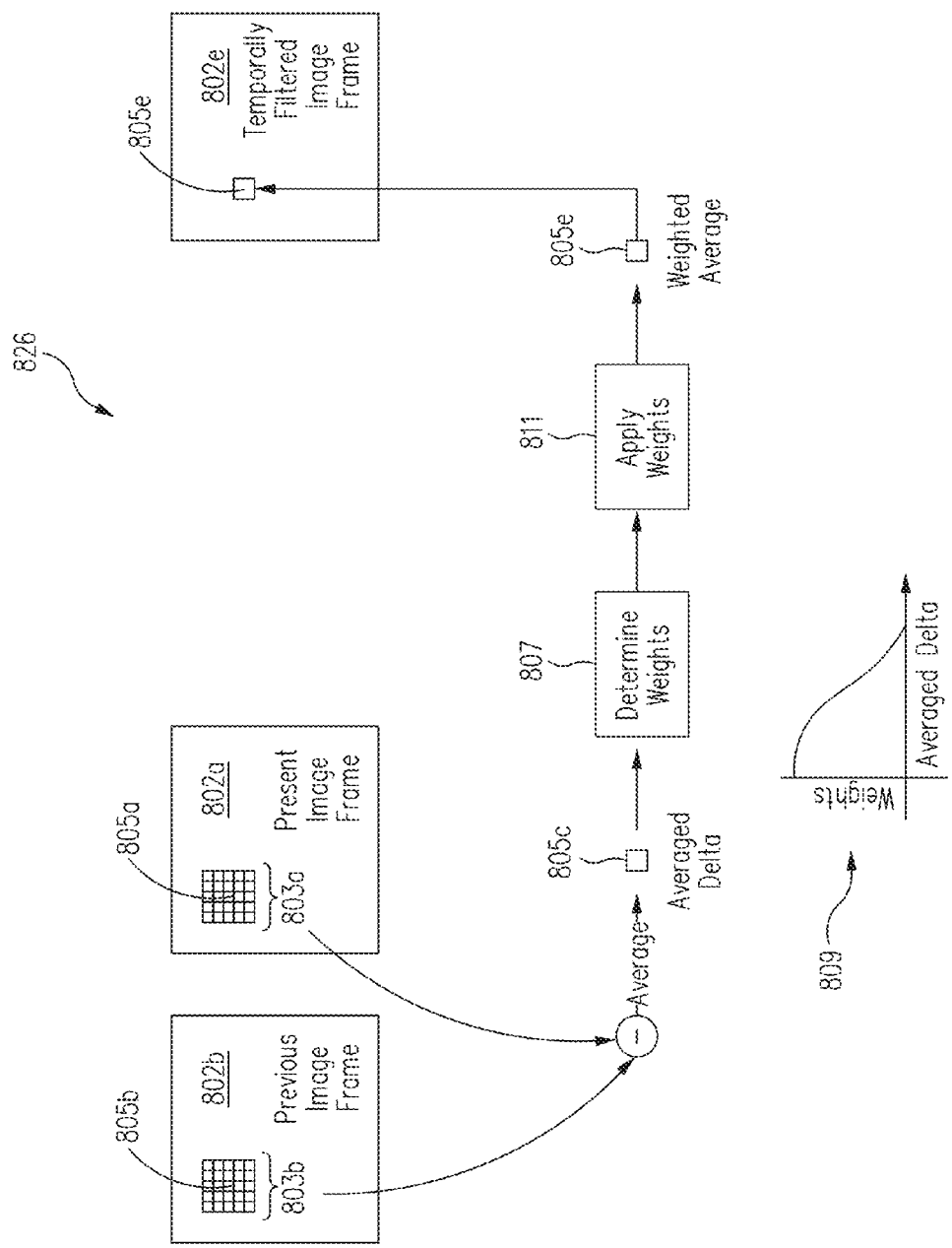
FIG. 9 illustrates a temporal noise reduction process in accordance with an embodiment of the disclosure.

In block 826, temporal filtering is performed on image frames 802 in accordance with a temporal noise reduction (TNR) process. FIG. 9 illustrates a TNR process in accordance with an embodiment of the disclosure. In FIG. 9, a presently received image frame 802a and a previously temporally filtered image frame 802b are processed to determine a new temporally filtered image frame 802e. Image frames 802a and 802b include local neighborhoods of pixels 803a and 803b centered around pixels 805a and 805b, respectively. Neighborhoods 803a and 803b correspond to the same locations within image frames 802a and 802b and are subsets of the total pixels in image frames 802a and 802b. In the illustrated embodiment, neighborhoods 803a and 803b include areas of 5 by 5 pixels. Other neighborhood sizes may be used in other embodiments.

Differences between corresponding pixels of neighborhoods 803a and 803b are determined and averaged to provide an averaged delta value 805c for the location corresponding to pixels 805a and 805b. Averaged delta value 805c may be used to determine weight values in block 807 to be applied to pixels 805a and 805b of image frames 802a and 802b.

In one embodiment, as shown in graph 809, the weight values determined in block 807 may be inversely proportional to averaged delta value 805c such that weight values drop rapidly towards zero when there are large differences between neighborhoods 803a and 803b. In this regard, large differences between neighborhoods 803a and 803b may indicate that changes have occurred within the scene (e.g., due to motion) and pixels 802a and 802b may be appropriately weighted, in one embodiment, to avoid introducing blur across frame-to-frame scene changes. Other associations between weight values and averaged delta value 805c may be used in various embodiments.

The weight values determined in block 807 may be applied to pixels 805a and 805b to determine a value for corresponding pixel 805e of image frame 802e (block 811). In this regard, pixel 805e may have a value that is a weighted average (or other combination) of pixels 805a and 805b, depending on averaged delta value 805c and the weight values determined in block 807.

For example, pixel 805e of temporally filtered image frame 802e may be a weighted sum of pixels 805a and 805b of image frames 802a and 802b. If the average difference between pixels 805a and 805b is due to noise, then it may be expected that the average change between neighborhoods 805a and 805b will be close to zero (e.g., corresponding to the average of uncorrelated changes). Under such circumstances, it may be expected that the sum of the differences between neighborhoods 805a and 805b will be close to zero. In this case, pixel 805a of image frame 802a may both be appropriately weighted so as to contribute to the value of pixel 805e.

However, if the sum of such differences is not zero (e.g., even differing from zero by a small amount in one embodiment), then the changes may be interpreted as being attributed to motion instead of noise. Thus, motion may be detected based on the average change exhibited by neighborhoods 805a and 805b. Under these circumstances, pixel 805a of image frame 802a may be weighted heavily, while pixel 805b of image frame 802b may be weighted lightly.

Other embodiments are also contemplated. For example, although averaged delta value 805c has been described as being determined based on neighborhoods 805a and 805b, in other embodiments averaged delta value 805c may be determined based on any desired criteria (e.g., based on individual pixels or other types of groups of sets of pixels).

In the above embodiments, image frame 802a has been described as a presently received image frame and image frame 802b has been described as a previously temporally filtered image frame. In another embodiment, image frames 802a and 802b may be first and second image frames captured by infrared imaging module 100 that have not been temporally filtered.

Figure 10:
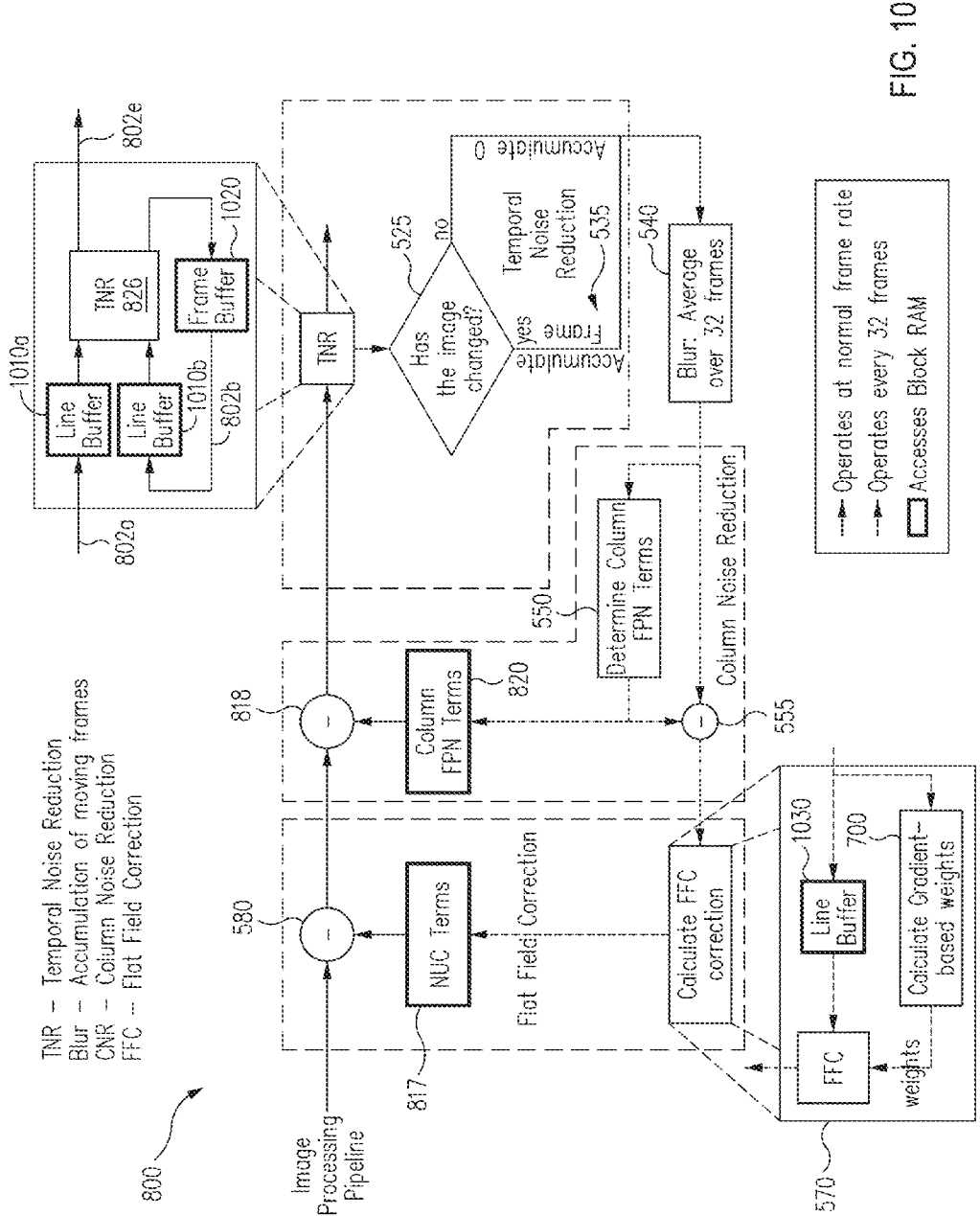
FIG. 10 illustrates particular implementation details of several processes of the image processing pipeline of FIG. 6 in accordance with an embodiment of the disclosure.

FIG. 10 illustrates further implementation details in relation to the TNR process of block 826. As shown in FIG. 10, image frames 802a and 802b may be read into line buffers 1010a and 1010b, respectively, and image frame 802b (e.g., the previous image frame) may be stored in a frame buffer 1020 before being read into line buffer 1010b. In one embodiment, line buffers 1010a-b and frame buffer 1020 may be implemented by a block of random access memory (RAM) provided by any appropriate component of infrared imaging module 100 and/or host device 102.

Referring again to FIG. 8, image frame 802e may be passed to an automatic gain compensation block 828 for further processing to provide a result image frame 830 that may be used by host device 102 as desired.

FIG. 8 further illustrates various operations that may be performed to determine row and column FPN terms and NUC terms as discussed. In one embodiment, these operations may use image frames 802e as shown in FIG. 8. Because image frames 802e have already been temporally filtered, at least some temporal noise may be removed and thus will not inadvertently affect the determination of row and column FPN terms 824 and 820 and NUC terms 817. In another embodiment, non-temporally filtered image frames 802 may be used.

In FIG. 8, blocks 510, 515, and 520 of FIG. 5 are collectively represented together. As discussed, a NUC process may be selectively initiated and performed in response to various NUC process initiating events and based on various criteria or conditions. As also discussed, the NUC process may be performed in accordance with a motion-based approach (blocks 525, 535, and 540) or a defocus-based approach (block 530) to provide a blurred image frame (block 545). FIG. 8 further illustrates various additional blocks 550, 552, 555, 560, 565, 570, 571, 572, 573, and 575 previously discussed with regard to FIG. 5.

As shown in FIG. 8, row and column FPN terms 824 and 820 and NUC terms 817 may be determined and applied in an iterative fashion such that updated terms are determined using image frames 802 to which previous terms have already been applied. As a result, the overall process of FIG. 8 may repeatedly update and apply such terms to continuously reduce the noise in image frames 830 to be used by host device 102.

Referring again to FIG. 10, further implementation details are illustrated for various blocks of FIGS. 5 and 8 in relation to pipeline 800. For example, blocks 525, 535, and 540 are shown as operating at the normal frame rate of image frames 802 received by pipeline 800. In the embodiment shown in FIG. 10, the determination made in block 525 is represented as a decision diamond used to determine whether a given image frame 802 has sufficiently changed such that it may be considered an image frame that will enhance the blur if added to other image frames and is therefore accumulated (block 535 is represented by an arrow in this embodiment) and averaged (block 540).

Also in FIG. 10, the determination of column FPN terms 820 (block 550) is shown as operating at an update rate that in this example is 1/32 of the sensor frame rate (e.g., normal frame rate) due to the averaging performed in block 540. Other update rates may be used in other embodiments. Although only column FPN terms 820 are identified in FIG. 10, row FPN terms 824 may be implemented in a similar fashion at the reduced frame rate.

FIG. 10 also illustrates further implementation details in relation to the NUC determination process of block 570. In this regard, the blurred image frame may be read to a line buffer 1030 (e.g., implemented by a block of RAM provided by any appropriate component of infrared imaging module 100 and/or host device 102). The flat field correction technique 700 of FIG. 7 may be performed on the blurred image frame.

In view of the present disclosure, it will be appreciated that techniques described herein may be used to remove various types of FPN (e.g., including very high amplitude FPN) such as spatially correlated row and column FPN and spatially uncorrelated FPN.

Other embodiments are also contemplated. For example, in one embodiment, the rate at which row and column FPN terms and/or NUC terms are updated can be inversely proportional to the estimated amount of blur in the blurred image frame and/or inversely proportional to the magnitude of local contrast values (e.g., determined in block 560).

In various embodiments, the described techniques may provide advantages over conventional shutter-based noise correction techniques. For example, by using a shutterless process, a shutter (e.g., such as shutter 105) need not be provided, thus permitting reductions in size, weight, cost, and mechanical complexity. Power and maximum voltage supplied to, or generated by, infrared imaging module 100 may also be reduced if a shutter does not need to be mechanically operated. Reliability will be improved by removing the shutter as a potential point of failure. A shutterless process also eliminates potential image interruption caused by the temporary blockage of the imaged scene by a shutter.

Also, by correcting for noise using intentionally blurred image frames captured from a real world scene (not a uniform scene provided by a shutter), noise correction may be performed on image frames that have irradiance levels similar to those of the actual scene desired to be imaged. This can improve the accuracy and effectiveness of noise correction terms determined in accordance with the various described techniques.

Systems and methods disclosed herein, in accordance with one or more embodiments, provide image processing algorithms for images captured by infrared imaging systems. For example, in one embodiment, the infrared images may be processed to reduce noise within the infrared images (e.g., improve image detail and/or image quality). For one or more embodiments, processing techniques may be applied to reduce noise within a row and/or a column of the infrared image.

A significant portion of noise may be defined as row and column noise. This type of noise may be explained by non-linearities in a Read Out Integrated Circuit (ROIC). This type of noise, if not eliminated, may manifest as vertical and horizontal stripes in the final image and human observers are particularly sensitive to these types of image artifacts. Other systems relying on imagery from infrared sensors, such as, for example, automatic target trackers may also suffer from performance degradation, if row and column noise is present.

Because of non-linear behavior of infrared detectors and read-out integrated circuit (ROIC) assemblies, even when a shutter operation or external black body calibration is performed, there may be residual row and column noise (e.g., the scene being imaged may not have the exact same temperature as the shutter). The amount of row and column noise may increase over time, after offset calibration, increasing asymptotically to some maximum value. In one aspect, this may be referred to as 1/f type noise.

In any given frame, the row and column noise may be viewed as high frequency spatial noise. Conventionally, this type of noise may be reduced using filters in the spatial domain (e.g., local linear or non-linear low pass filters) or the frequency domain (e.g., low pass filters in Fourier or Wavelet space). However, these filters may have negative side effects, such as blurring of the image and potential loss of faint details.

It should be appreciated by those skilled in the art that any reference to a column or a row may include a partial column or a partial row and that the terms "row" and "column" are interchangeable and not limiting. Thus, without departing from the scope of the invention, the term "row" may be used to describe a row or a column, and likewise, the term "column" may be used to describe a row or a column, depending upon the application.

Figure 12:
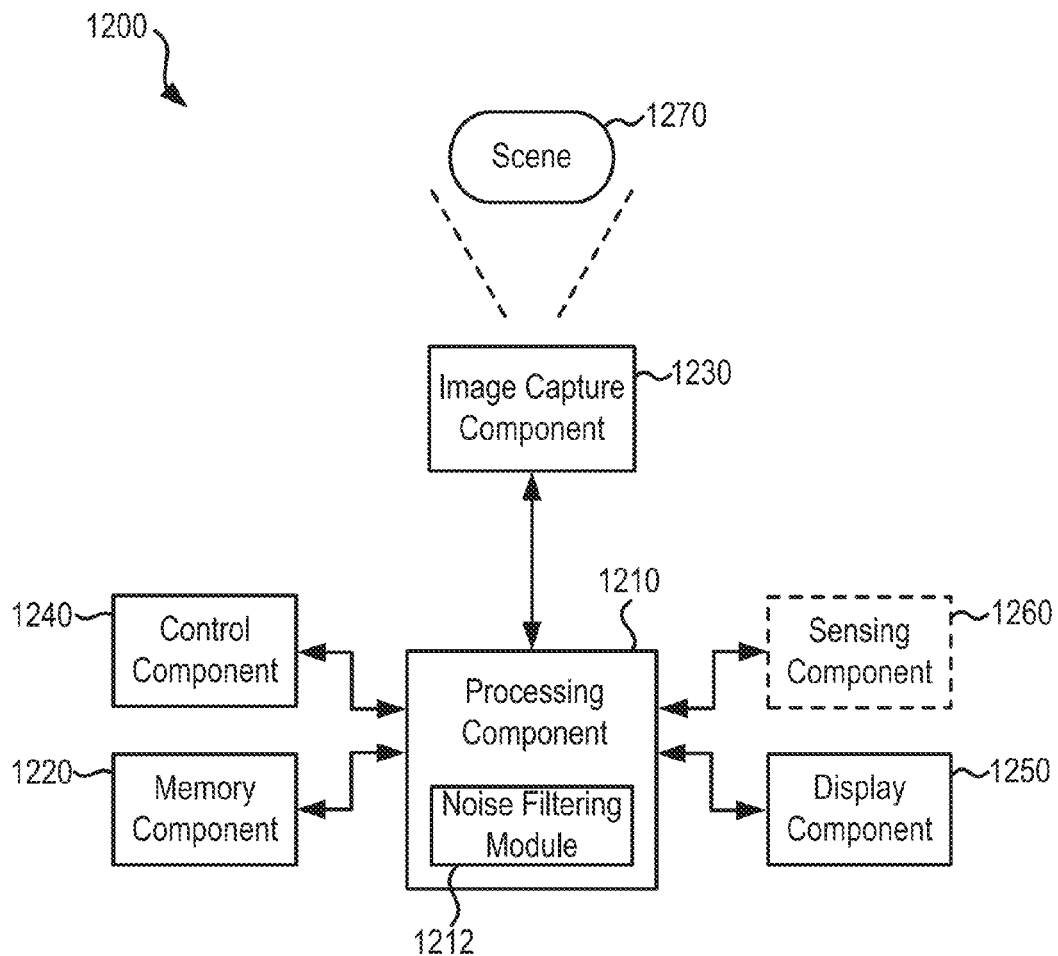
FIG. 12 shows a block diagram of a system for infrared image processing, in accordance with an embodiment of the disclosure.

FIG. 12 shows a block diagram of a system 1200 (e.g., an infrared camera or other type of imaging system) for infrared image capturing and processing in accordance with an embodiment. The system 1200 comprises, in one implementation, a processing component 1210, a memory component 1220, an image capture component 1230, a control component 1240, and a display component 1250. Optionally, the system 1200 may include a sensing component 1260.

The system 1200 may represent an infrared imaging device, such as an infrared camera, to capture and process images, such as video images of a scene 1270. The system 1200 may represent any type of infrared camera adapted to detect infrared radiation and provide representative data and information (e.g., infrared image data of a scene). For example, the system 1200 may represent an infrared camera that is directed to the near, middle, and/or far infrared spectrums. In another example, the infrared image data may comprise non-uniform data (e.g., real image data that is not from a shutter or black body) of the scene 1270, for processing, as set forth herein. The system 1200 may comprise a portable device and may be incorporated, e.g., into a vehicle (e.g., an automobile or other type of land-based vehicle, an aircraft, or a spacecraft) or a non-mobile installation requiring infrared images to be stored and/or displayed.

In various embodiments, the processing component 1210 comprises a processor, such as one or more of a microprocessor, a single-core processor, a multi-core processor, a microcontroller, a logic device (e.g., a programmable logic device (PLD) configured to perform processing functions), a digital signal processing (DSP) device, etc. The processing component 1210 may be adapted to interface and communicate with components 1220, 1230, 1240, and 1250 to perform method and processing steps and/or operations, as described herein. The processing component 1210 may include a noise filtering module 1212 adapted to implement a noise reduction and/or removal algorithm (e.g., a noise filtering algorithm, such as discussed in reference to FIGS. 13A-13C). In one aspect, the processing component 1210 may be adapted to perform various other image processing algorithms including scaling the infrared image data, either as part of or separate from the noise filtering algorithm.

It should be appreciated that noise filtering module 1212 may be integrated in software and/or hardware as part of the processing component 1210, with code (e.g., software or configuration data) for the noise filtering module 1212 stored, e.g., in the memory component 1220. Embodiments of the noise filtering algorithm, as disclosed herein, may be stored by a separate computer-readable medium (e.g., a memory, such as a hard drive, a compact disk, a digital video disk, or a flash memory) to be executed by a computer (e.g., a logic or processor-based system) to perform various methods and operations disclosed herein. In one aspect, the computer-readable medium may be portable and/or located separate from the system 1200, with the stored noise filtering algorithm provided to the system 1200 by coupling the computer-readable medium to the system 1200 and/or by the system 1200 downloading (e.g., via a wired link and/or a wireless link) the noise filtering algorithm from the computer-readable medium.

The memory component 1200 comprises, in one embodiment, one or more memory devices adapted to store data and information, including infrared data and information. The memory device 1220 may comprise one or more various types of memory devices including volatile and non-volatile memory devices, such as RAM (Random Access Memory), ROM (Read-Only Memory), EEPROM (Electrically-Erasable Read-Only Memory), flash memory, etc. The processing component 1210 may be adapted to execute software stored in the memory component 1220 so as to perform method and process steps and/or operations described herein.

The image capture component 1230 comprises, in one embodiment, one or more infrared sensors (e.g., any type of multi-pixel infrared detector, such as a focal plane array) for capturing infrared image data (e.g., still image data and/or video data) representative of an image, such as scene 1270. In one implementation, the infrared sensors of the image capture component 1230 provide for representing (e.g., converting) the captured image data as digital data (e.g., via an analog-to-digital converter included as part of the infrared sensor or separate from the infrared sensor as part of the system 1200). In one aspect, the infrared image data (e.g., infrared video data) may comprise non-uniform data (e.g., real image data) of an image, such as scene 1270. The processing component 1210 may be adapted to process the infrared image data (e.g., to provide processed image data), store the infrared image data in the memory component 1220, and/or retrieve stored infrared image data from the memory component 1220. For example, the processing component 1210 may be adapted to process infrared image data stored in the memory component 1220 to provide processed image data and information (e.g., captured and/or processed infrared image data).

The control component 1240 comprises, in one embodiment, a user input and/or interface device, such as a rotatable knob (e.g., potentiometer), push buttons, slide bar, keyboard, etc., that is adapted to generate a user input control signal. The processing component 1210 may be adapted to sense control input signals from a user via the control component 1240 and respond to any sensed control input signals received therefrom. The processing component 1210 may be adapted to interpret such a control input signal as a value, as generally understood by one skilled in the art.

In one embodiment, the control component 1240 may comprise a control unit (e.g., a wired or wireless handheld control unit) having push buttons adapted to interface with a user and receive user input control values. In one implementation, the push buttons of the control unit may be used to control various functions of the system 1200, such as autofocus, menu enable and selection, field of view, brightness, contrast, noise filtering, high pass filtering, low pass filtering, and/or various other features as understood by one skilled in the art. In another implementation, one or more of the push buttons may be used to provide input values (e.g., one or more noise filter values, adjustment parameters, characteristics, etc.) for a noise filter algorithm. For example, one or more push buttons may be used to adjust noise filtering characteristics of infrared images captured and/or processed by the system 1200.

The display component 1250 comprises, in one embodiment, an image display device (e.g., a liquid crystal display (LCD)) or various other types of generally known video displays or monitors. The processing component 1210 may be adapted to display image data and information on the display component 1250. The processing component 1210 may be adapted to retrieve image data and information from the memory component 1220 and display any retrieved image data and information on the display component 1250. The display component 1250 may comprise display electronics, which may be utilized by the processing component 1210 to display image data and information (e.g., infrared images). The display component 1250 may be adapted to receive image data and information directly from the image capture component 1230 via the processing component 1210, or the image data and information may be transferred from the memory component 1220 via the processing component 1210.

The optional sensing component 1260 comprises, in one embodiment, one or more sensors of various types, depending on the application or implementation requirements, as would be understood by one skilled in the art. The sensors of the optional sensing component 1260 provide data and/or information to at least the processing component 1210. In one aspect, the processing component 1210 may be adapted to communicate with the sensing component 1260 (e.g., by receiving sensor information from the sensing component 1260) and with the image capture component 1230 (e.g., by receiving data and information from the image capture component 1230 and providing and/or receiving command, control, and/or other information to and/or from one or more other components of the system 1200).

In various implementations, the sensing component 1260 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. The sensing component 1260 may represent conventional sensors as generally known by one skilled in the art for monitoring various conditions (e.g., environmental conditions) that may have an effect (e.g., on the image appearance) on the data provided by the image capture component 1230.

In some implementations, the optional sensing component 1260 (e.g., one or more of sensors) may comprise devices that relay information to the processing component 1210 via wired and/or wireless communication. For example, the optional sensing component 1260 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of the system 1200 may be combined and/or implemented or not, as desired or depending on the application or requirements, with the system 1200 representing various functional blocks of a related system. In one example, the processing component 1210 may be combined with the memory component 1220, the image capture component 1230, the display component 1250, and/or the optional sensing component 1260. In another example, the processing component 1210 may be combined with the image capture component 1230 with only certain functions of the processing component 1210 performed by circuitry (e.g., a processor, a microprocessor, a logic device, a microcontroller, etc.) within the image capture component 1230. Furthermore, various components of the system 1200 may be remote from each other (e.g., image capture component 1230 may comprise a remote sensor with processing component 1210, etc. representing a computer that may or may not be in communication with the image capture component 1230).

Figure 13A:
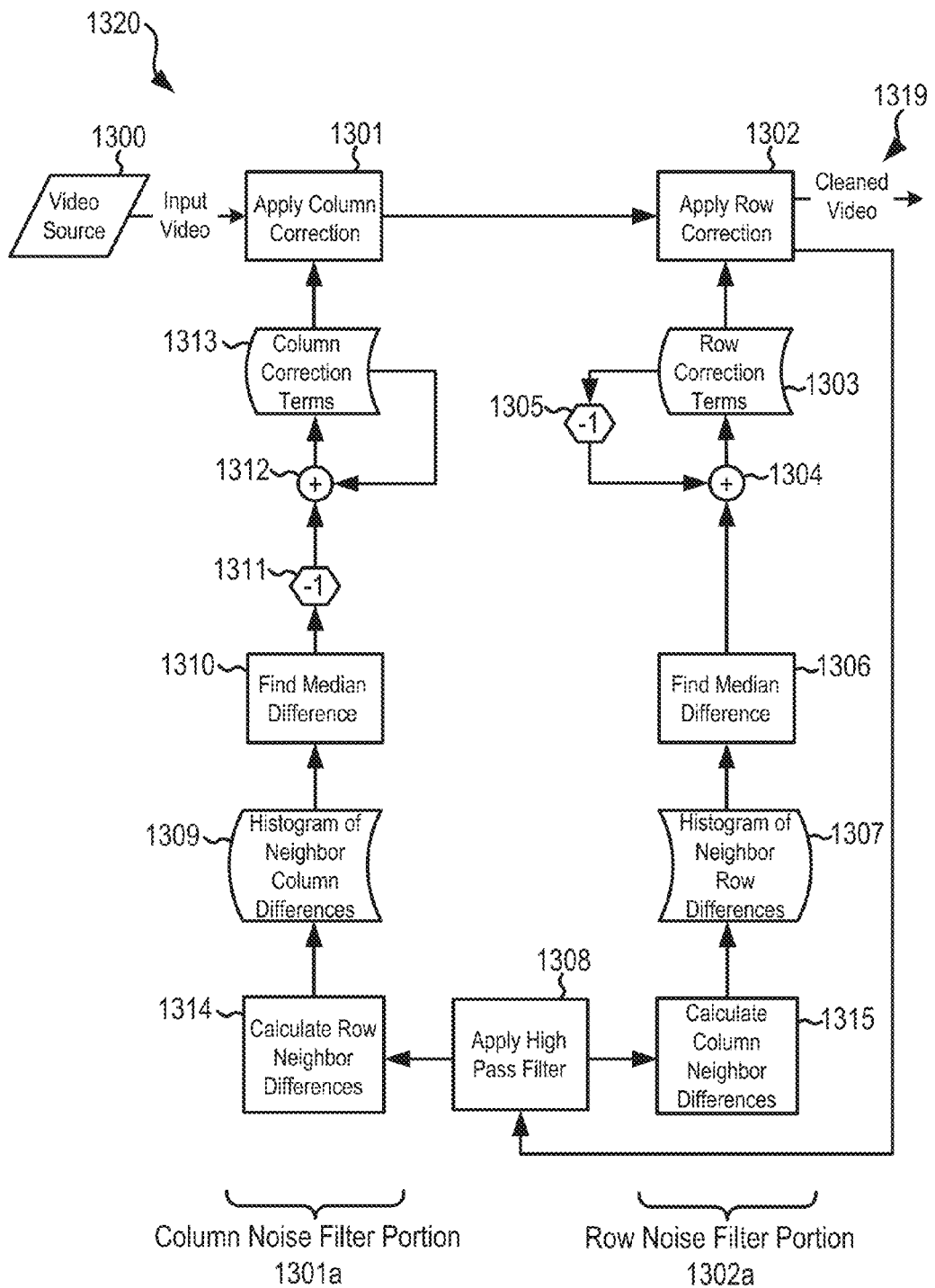
FIGS. 13A-13C are flowcharts illustrating methods for noise filtering an infrared image, in accordance with embodiments of the disclosure.

In accordance with an embodiment of the invention, FIG. 13A shows a method 1320 for noise filtering an infrared image. In one implementation, this method 1320 relates to the reduction and/or removal of temporal, 1/f, and/or fixed spatial noise in infrared imaging devices, such as infrared imaging system 1200 of FIG. 12. The method 1320 is adapted to utilize the row and column based noise components of infrared image data in a noise filtering algorithm. In one aspect, the row and column based noise components may dominate the noise in imagery of infrared sensors (e.g., approximately ⅔ of the total noise may be spatial in a typical micro-bolometer based system).

In one embodiment, the method 1320 of FIG. 13A comprises a high level block diagram of row and column noise filtering algorithms. In one aspect, the row and column noise filter algorithms may be optimized to use minimal hardware resources.

Referring to FIG. 13A, the process flow of the method 1320 implements a recursive mode of operation, wherein the previous correction terms are applied before calculating row and column noise, which may allow for correction of lower spatial frequencies. In one aspect, the recursive approach is useful when row and column noise is spatially correlated. This is sometimes referred to as banding and, in the column noise case, may manifest as several neighboring columns being affected by a similar offset error. When several neighbors used in difference calculations are subject to similar error, the mean difference used to calculate the error may be skewed, and the error may only be partially corrected. By applying partial correction prior to calculating the error in the current frame, correction of the error may be recursively reduced until the error is minimized or eliminated. In the recursive case, if the HPF is not applied (block 1308), then natural gradients as part of the image may, after several iterations, be distorted when merged into the noise model. In one aspect, a natural horizontal gradient may appear as low spatially correlated column noise (e.g., severe banding). In another aspect, the HPF may prevent very low frequency scene information to interfere with the noise estimate and, therefore, limits the negative effects of recursive filtering.

Referring to method 1320 of FIG. 13A, infrared image data (e.g., a raw video source, such as from the image capture component 1230 of FIG. 12) is received as input video data (block 1300). Next, column correction terms are applied to the input video data (block 1301), and row correction terms are applied to the input video data (block 1302). Next, video data (e.g., "cleaned" video data) is provided as output video data (1319) after column and row corrections are applied to the input video data. In one aspect, the term "cleaned" may refer to removing or reducing noise (blocks 1301, 1302) from the input video data via, e.g., one or more embodiments of the noise filter algorithm.

Referring to the processing portion (e.g., recursive processing) of FIG. 13A, a HPF is applied (block 1308) to the output video data 1319 via data signal path 1319a. In one implementation, the high pass filtered data is separately provided to a column noise filter portion 1301a and a row noise filter portion 1302a.

Referring to the column noise filter portion 1301a, the method 1320 may be adapted to process the input video data 1300 and/or output video data 1319 as follows:

1. Apply previous column noise correction terms to a current frame as calculated in a previous frame (block 1301).

2. High pass filter the row of the current frame by subtracting the result of a low pass filter (LPF) operation (block 1308), for example, as discussed in reference to FIGS. 14A-14C.

3. For each pixel, calculate a difference between a center pixel and one or more (e.g., eight) nearest neighbors (block 1314). In one implementation, the nearest neighbors comprise one or more nearest horizontal neighbors. The nearest neighbors may include one or more vertical or other non-horizontal neighbors (e.g., not pure horizontal, i.e., on the same row), without departing from the scope of the invention.

4. If the calculated difference is below a predefined threshold, add the calculated difference to a histogram of differences for the specific column (block 1309).

5. At an end of the current frame, find a median difference by examining a cumulative histogram of differences (block 1310). In one aspect, for added robustness, only differences with some specified minimum number of occurrences may be used.

6. Delay the current correction terms for one frame (block 1311), i.e., they are applied to the next frame.

7. Add median difference (block 1312) to previous column correction terms to provide updated column correction terms (block 1313).

8. Apply updated column noise correction terms in the next frame (block 1301).

Referring to the row noise filter portion 1302a, the method 1320 may be adapted to process the input video data 1300 and/or output video data 1319 as follows:

1. Apply previous row noise correction terms to a current frame as calculated in a previous frame (block 1302).

2. High pass filter the column of the current frame by subtracting the result of a low pass filter (LPF) operation (block 1308), as discussed similarly above for column noise filter portion 1301a.

3. For each pixel, calculate a difference between a center pixel and one or more (e.g., eight) nearest neighbors (block 1315). In one implementation, the nearest neighbors comprise one or more nearest vertical neighbors. The nearest neighbors may include one or more horizontal or other non-vertical neighbors (e.g., not pure vertical, i.e., on the same column), without departing from the scope of the invention.

4. If the calculated difference is below a predefined threshold, add the calculated difference to a histogram of differences for the specific row (block 1307).

5. At an end of the current row (e.g., line), find a median difference by examining a cumulative histogram of differences (block 1306). In one aspect, for added robustness only differences with some specified minimum number of occurrences may be used.

6. Delay the current frame by a time period equivalent to the number of nearest vertical neighbors used, for example eight.

7. Add median difference (block 1304) to row correction terms (block 1303) from previous frame (block 1305).

8. Apply updated row noise correction terms in the current frame (block 1302). In one aspect, this may require a row buffer (e.g., as mentioned in 6).

In one aspect, for all pixels (or at least a large subset of them) in each column, an identical offset term (or set of terms) may be applied for each associated column. This may prevent the filter from blurring spatially local details.

Similarly, in one aspect, for all pixels (or at least a large subset of them) in each row respectively, an identical offset term (or set of terms) may be applied. This may inhibit the filter from blurring spatially local details.

In one example, an estimate of the column offset terms may be calculated using only a subset of the rows (e.g., the first 32 rows). In this case, only a 32 row delay is needed to apply the column correction terms in the current frame. This may improve filter performance in removing high temporal frequency column noise. Alternatively, the filter may be designed with minimum delay, and the correction terms are only applied once a reasonable estimate can be calculated (e.g., using data from the 32 rows). In this case, only rows 33 and beyond may be optimally filtered.

In one aspect, all samples may not be needed, and in such an instance, only every 2nd or 4th row, e.g., may be used for calculating the column noise. In another aspect, the same may apply when calculating row noise, and in such an instance, only data from every 4th column, e.g., may be used. It should be appreciated that various other iterations may be used by one skilled in the art without departing from the scope of the invention.

In one aspect, the filter may operate in recursive mode in which the filtered data is filtered instead of the raw data being filtered. In another aspect, the mean difference between a pixel in one row and pixels in neighboring rows may be approximated in an efficient way if a recursive (IIR) filter is used to calculate an estimated running mean. For example, instead of taking the mean of neighbor differences (e.g., eight neighbor differences), the difference between a pixel and the mean of the neighbors may be calculated.

Figure 13B:
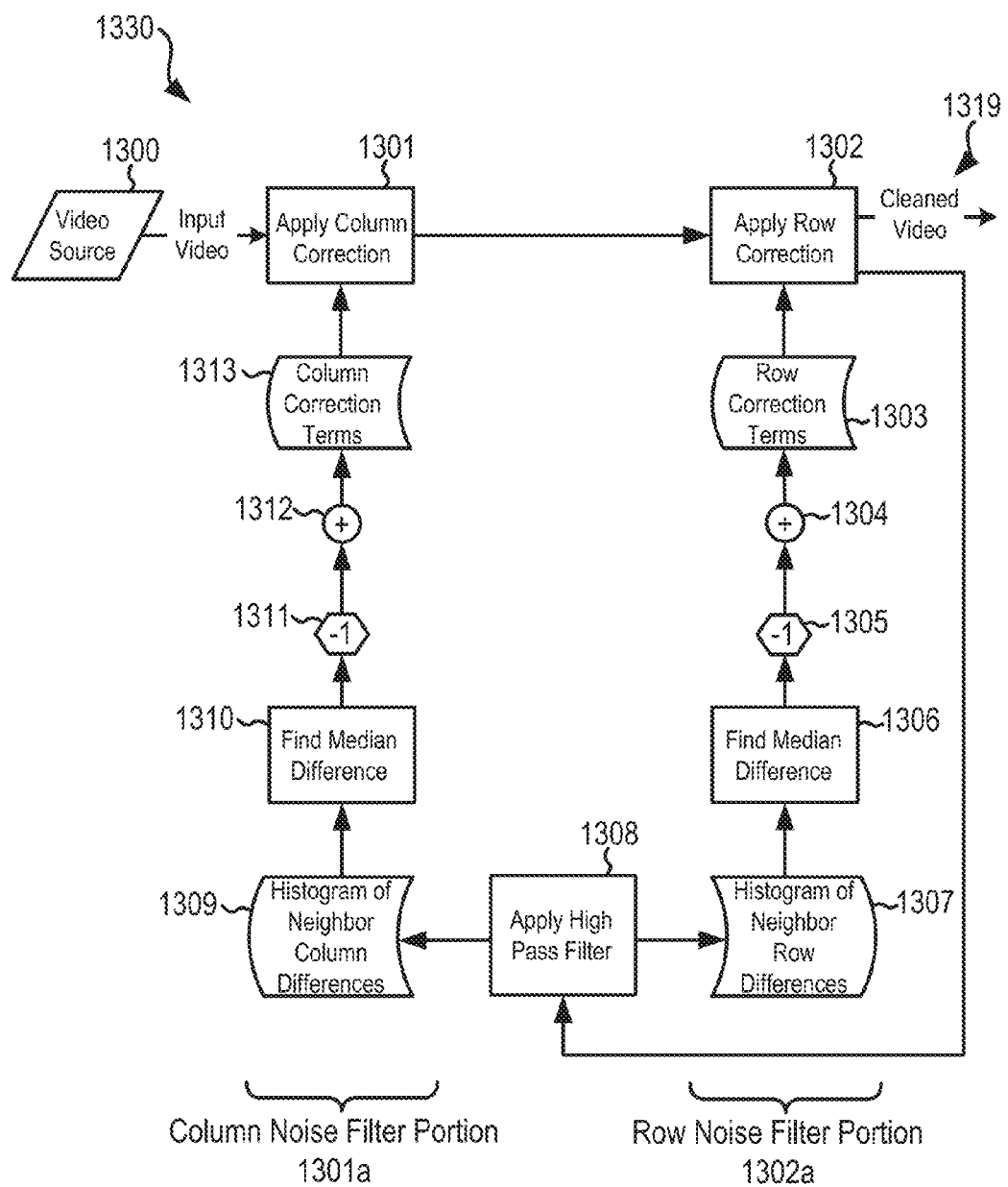

In accordance with an embodiment of the invention, FIG. 13B shows an alternative method 1330 for noise filtering infrared image data. In reference to FIGS. 13A and 13B, one or more of the process steps and/or operations of method 1320 of FIG. 13A have changed order or have been altered or combined for the method 1320 of FIG. 13B. For example, the operation of calculating row and column neighbor differences (blocks 1314, 1315) may be removed or combined with other operations, such as generating histograms of row and column neighbor differences (blocks 1307, 1309). In another example, the delay operation (block 1305) may be performed after finding the median difference (block 1306). In various examples, it should be appreciated that similar process steps and/or operations have similar scope, as previously described in FIG. 13A, and therefore, the description will not be repeated.

In still other alternate approaches to methods 1320 and 1330, embodiments may exclude the histograms and rely on mean calculated differences instead of median calculated differences. In one aspect, this may be slightly less robust but may allow for a simpler implementation of the column and row noise filters. For example, the mean of neighboring rows and columns, respectively, may be approximated by a running mean implemented as an infinite impulse response (IIR) filter. In the row noise case, the IIR filter implementation may reduce or even eliminate the need to buffer several rows of data for mean calculations.

In still other alternate approaches to methods 1320 and 1330, new noise estimates may be calculated in each frame of the video data and only applied in the next frame (e.g., after noise estimates). In one aspect, this alternate approach may provide less performance but may be easier to implement. In another aspect, this alternate approach may be referred to as a non-recursive method, as understood by those skilled in the art.

Figure 13C:
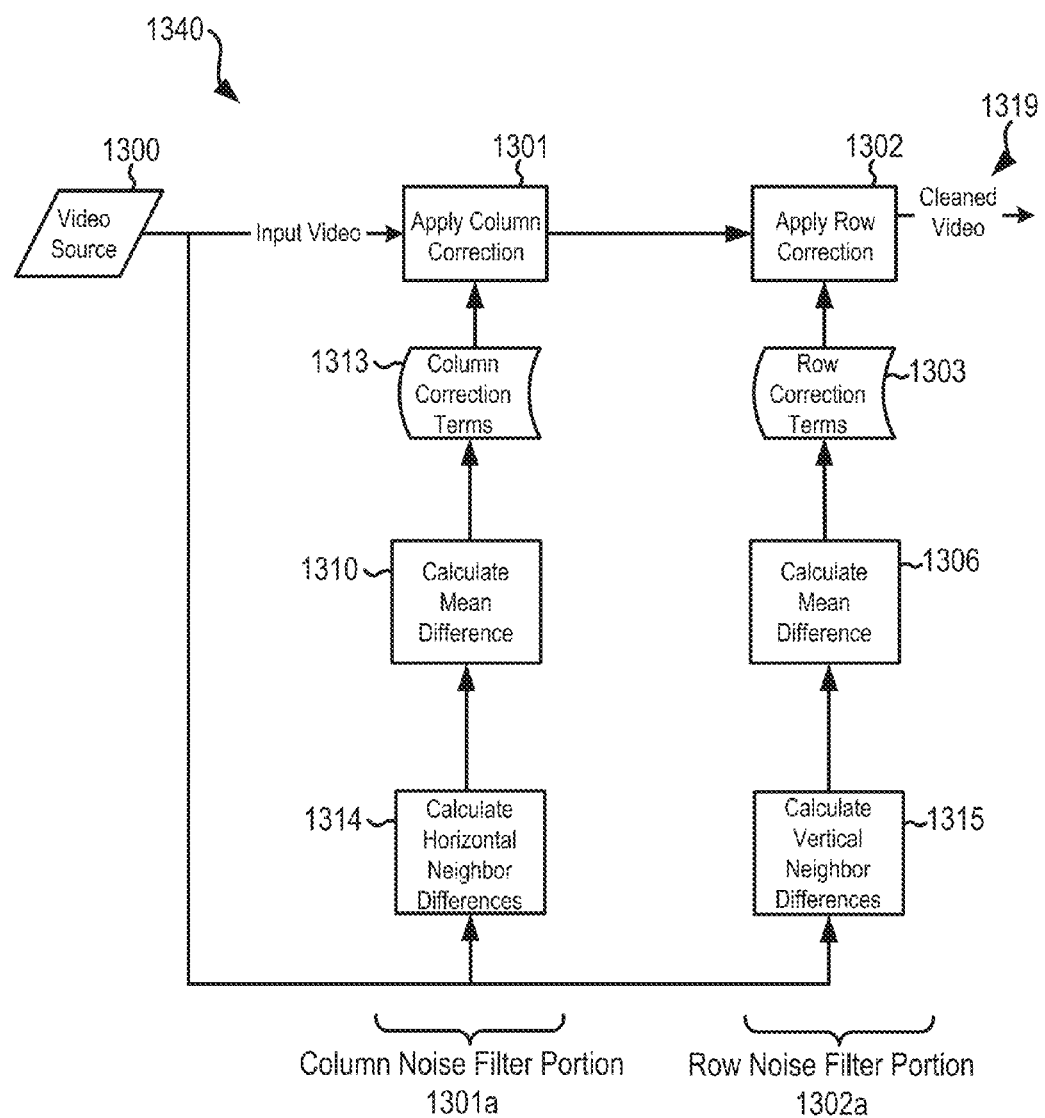

For example, in one embodiment, the method 1340 of FIG. 13C comprises a high level block diagram of row and column noise filtering algorithms. In one aspect, the row and column noise filter algorithms may be optimized to use minimal hardware resources. In reference to FIGS. 13A and 13B, similar process steps and/or operations may have similar scope, and therefore, the descriptions will not be repeated.

Referring to FIG. 13C, the process flow of the method 1340 implements a non-recursive mode of operation. As shown, the method 1340 applies column offset correction term 1301 and row offset correction term 1302 to the uncorrected input video data from video source 1300 to produce, e.g., a corrected or cleaned output video signal 1319. In column noise filter portion 1301a, column offset correction terms 1313 are calculated based on the mean difference 1310 between pixel values in a specific column and one or more pixels belonging to neighboring columns 1314. In row noise filter portion 1302a, row offset correction terms 1303 are calculated based on the mean difference 1306 between pixel values in a specific row and one or more pixels belonging to neighboring rows 1315. In one aspect, the order (e.g., rows first or columns first) in which row or column offset correction terms 1303, 1313 are applied to the input video data from video source 1300 may be considered arbitrary. In another aspect, the row and column correction terms may not be fully known until the end of the video frame, and therefore, if the input video data from the video source 1300 is not delayed, the row and column correction terms 1303, 1313 may not be applied to the input video data from which they where calculated.

In one aspect of the invention, the column and row noise filter algorithm may operate continuously on image data provided by an infrared imaging sensor (e.g., image capture component 1230 of FIG. 12). Unlike conventional methods that may require a uniform scene (e.g., as provided by a shutter or external calibrated black body) to estimate the spatial noise, the column and row noise filter algorithms, as set forth in one or more embodiments, may operate on real-time scene data. In one aspect, an assumption may be made that, for some small neighborhood around location [x, y], neighboring infrared sensor elements should provide similar values since they are imaging parts of the scene in close proximity. If the infrared sensor reading from a particular infrared sensor element differs from a neighbor, then this could be the result of spatial noise. However, in some instances, this may not be true for each and every sensor element in a particular row or column (e.g., due to local gradients that are a natural part of the scene), but on average, a row or column may have values that are close to the values of the neighboring rows and columns.

For one or more embodiments, by first taking out one or more low spatial frequencies (e.g., using a high pass filter (HPF)), the scene contribution may be minimized to leave differences that correlate highly with actual row and column spatial noise. In one aspect, by using an edge preserving filter, such as a Median filter or a Bilateral filter, one or more embodiments may minimize artifacts due to strong edges in the image.

Figure 14A:
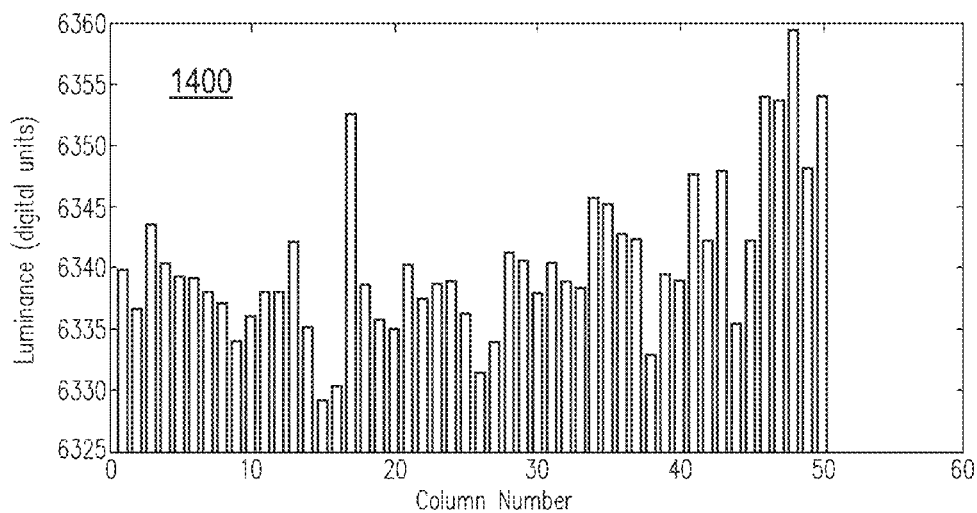
FIGS. 14A-14O are graphs illustrating infrared image data and the processing of an infrared image, in accordance with embodiments of the disclosure.
Figure 14B:
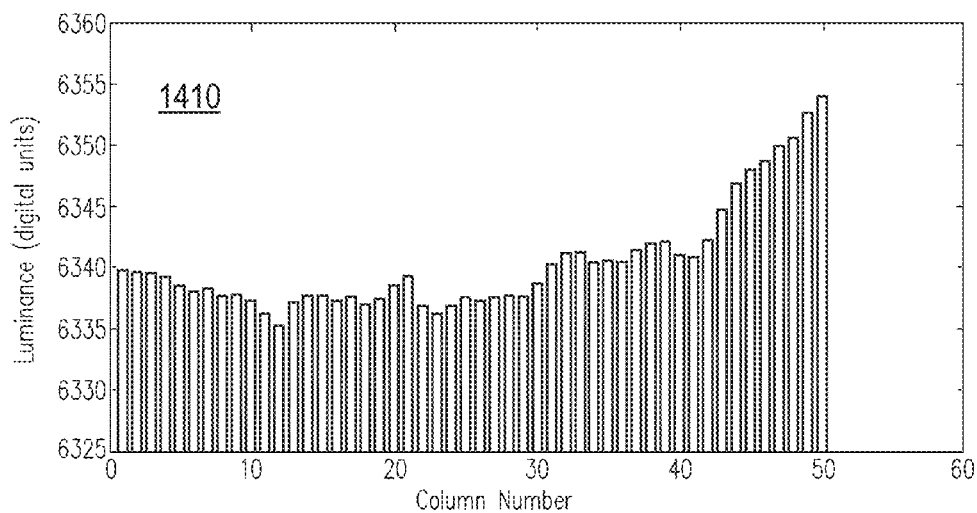
Figure 14C:
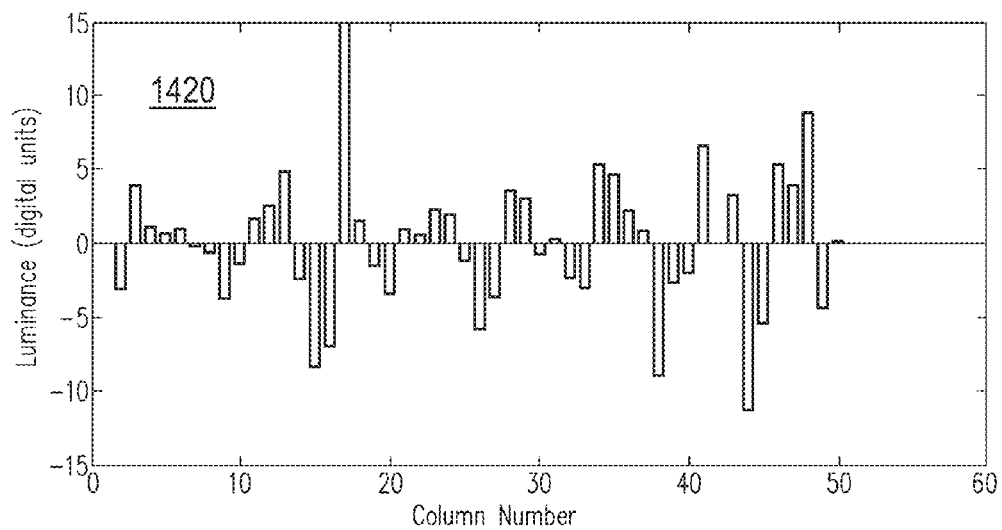

In accordance with one or more embodiments of the invention, FIGS. 14A to 14C show a graphical implementation (e.g., digital counts versus data columns) of filtering an infrared image. FIG. 14A shows a graphical illustration (e.g., graph 1400) of typical values, as an example, from a row of sensor elements when imaging a scene. FIG. 14B shows a graphical illustration (e.g., graph 1410) of a result of a low pass filtering (LPF) of the image data values from FIG. 14A. FIG. 14C shows a graphical illustration (e.g., graph 1420) of subtracting the low pass filter (LPF) output in FIG. 14B from the original image data in FIG. 14A, which results in a high pass filter (HPF) profile with low and mid frequency components removed from the scene of the original image data in FIG. 14A. Thus, FIG. 14A-140 illustrate a HPF technique, which may be used for one or more embodiments (e.g., as with methods 1320 and/or 1330).

In one aspect of the invention, a final estimate of column and/or row noise may be referred to as an average or median estimate of all of the measured differences. Because noise characteristics of an infrared sensor are often generally known, then one or more thresholds may be applied to the noise estimates. For example, if a difference of 60 digital counts is measured, but it is known that the noise typically is less than 10 digital counts, then this measurement may be ignored.

Figure 15:
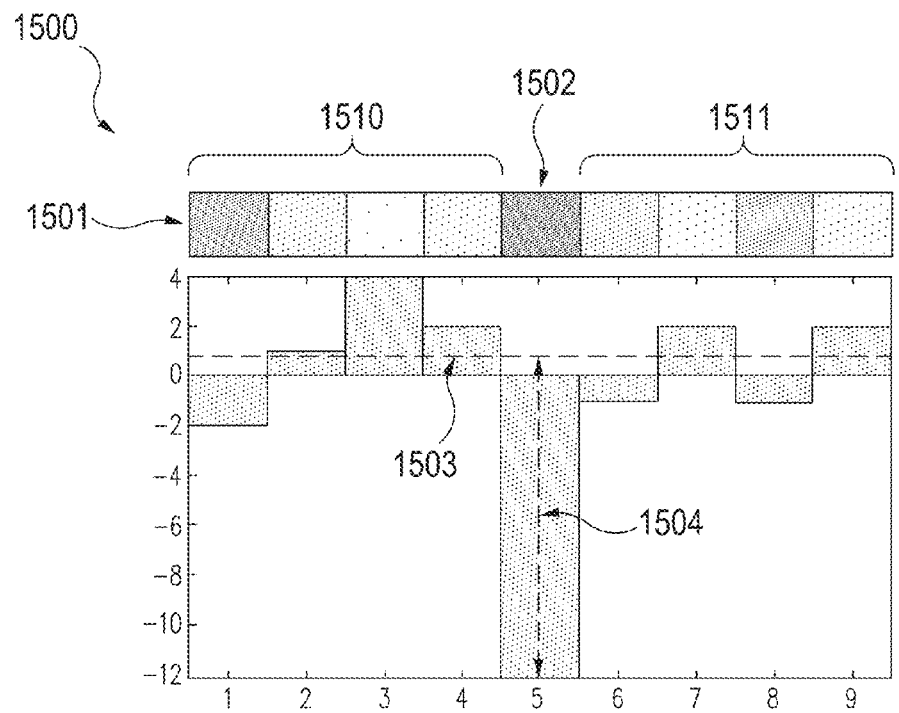
FIG. 15 shows a portion of a row of sensor data for discussing processing techniques, in accordance with embodiments of the disclosure.

In accordance with one or more embodiments of the invention, FIG. 15 shows a graphical illustration 1500 (e.g., digital counts versus data columns) of a row of sensor data 1501 (e.g., a row of pixel data for a plurality of pixels in a row) with column 5 data 1502 and data for eight nearest neighbors (e.g., nearest pixel neighbors, 4 columns 1510 to the left of column 5 data 1502 and 4 columns 1511 to the right of column 5 data 1502). In one aspect, referring to FIG. 4, the row of sensor data 1501 is part of a row of sensor data for an image or scene captured by a multi-pixel infrared sensor or detector (e.g., image capture component 1230 of FIG. 12). In one aspect, column 5 data 1502 is a column of data to be corrected. For this row of sensor data 1501, the difference between column 5 data 1502 and a mean 1503 of its neighbor columns (1510, 1511) is indicated by an arrow 1504. Therefore, noise estimates may be obtained and accounted for based on neighboring data.

Figure 16B:
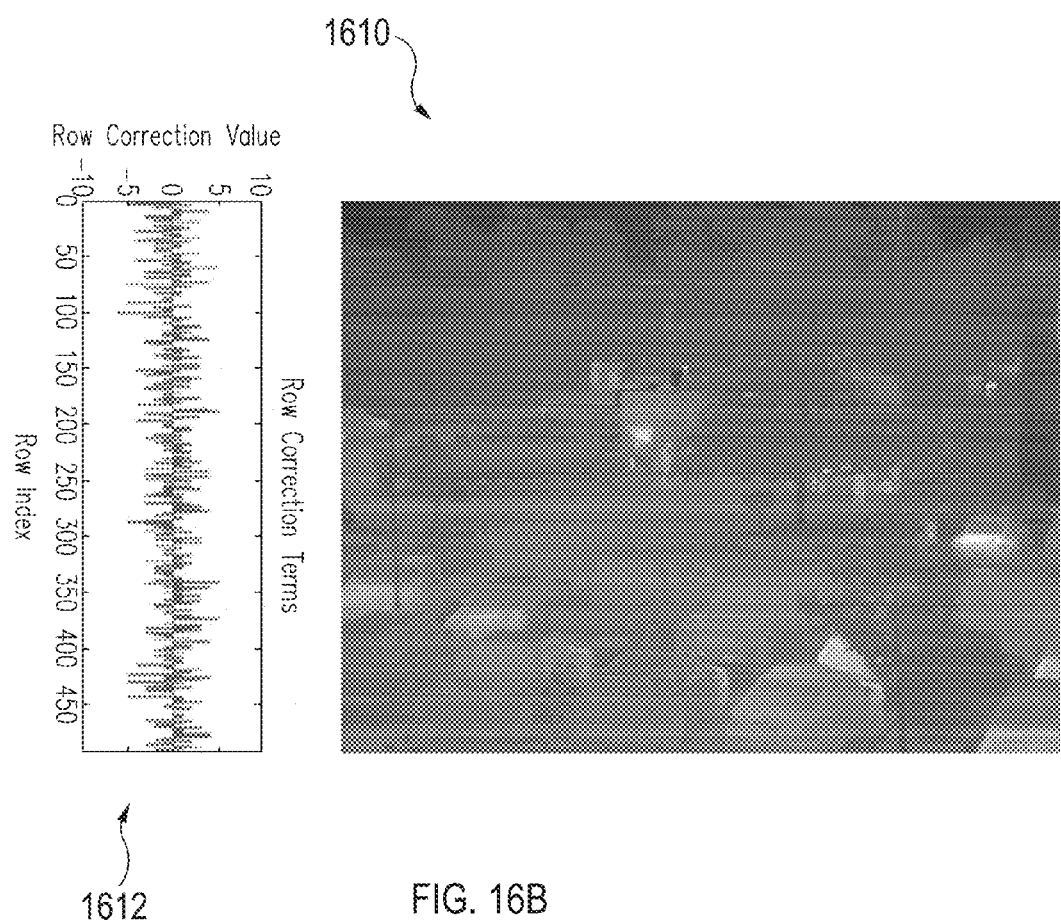
Figure 16C:

In accordance with one or more embodiments of the invention, FIGS. 16A to 16C show an exemplary implementation of column and row noise filtering an infrared image (e.g., an image frame from infrared video data). FIG. 16A shows an infrared image 1600 with column noise estimated from a scene with severe row and column noise present and a corresponding graph 1602 of column correction terms. FIG. 16B shows an infrared image 1610, with column noise removed and spatial row noise still present, with row correction terms estimated from the scene in FIG. 16A and a corresponding graph 1612 of row correction terms. FIG. 16C shows an infrared image 1620 of the scene in FIG. 16A as a cleaned infrared image with row and column noise removed (e.g., column and row correction terms of FIGS. 16A-16B applied).

In one embodiment, FIG. 16A shows an infrared video frame (i.e., infrared image 1600) with severe row and column noise. Column noise correction coefficients are calculated as described herein to produce, e.g., 639 correction terms, i.e., one correction term per column. The graph 1602 shows the column correction terms. These offset correction terms are subtracted from the infrared video frame 1600 of FIG. 16A to produce the infrared image 1610 in FIG. 16B. As shown in FIG. 16B, the row noise is still present. Row noise correction coefficients are calculated as described herein to produce, e.g., 639 row terms, i.e., one correction term per row. The graph 1612 shows the row offset correction terms, which are subtracted from the infrared image 1610 in FIG. 16B to produce the cleaned infrared image 1620 in FIG. 16C with significantly reduced or removed row and column noise.

In various embodiments, it should be understood that both row and column filtering is not required. For example, either column noise filtering 1301a or row noise filtering 1302a may be performed in methods 1320, 1330 or 1340.

It should be appreciated that any reference to a column or a row may include a partial column or a partial row and that the terms "row" and "column" are interchangeable and not limiting. For example, without departing from the scope of the invention, the term "row" may be used to describe a row or a column, and likewise, the term "column" may be used to describe a row or a column, depending upon the application.

In various aspects, column and row noise may be estimated by looking at a real scene (e.g., not a shutter or a black body), in accordance with embodiments of the noise filtering algorithms, as disclosed herein. The column and row noise may be estimated by measuring the median or mean difference between sensor readings from elements in a specific row (and/or column) and sensor readings from adjacent rows (and/or columns).

Optionally, a high pass filter may be applied to the image data prior to measuring the differences, which may reduce or at least minimize a risk of distorting gradients that are part of the scene and/or introducing artifacts. In one aspect, only sensor readings that differ by less than a configurable threshold may be used in the mean or median estimation. Optionally, a histogram may be used to effectively estimate the median. Optionally, only histogram bins exceeding a minimum count may be used when finding the median estimate from the histogram. Optionally, a recursive IIR filter may be used to estimate the difference between a pixel and its neighbors, which may reduce or at least minimize the need to store image data for processing, e.g., the row noise portion (e.g., if image data is read out row wise from the sensor). In one implementation, the current mean column value $\overline{C}_{i,j}$ for column i at row j may be estimated using the following recursive filter algorithm.

$$\overline{C}_{i,j} = (1-\alpha) \cdot \overline{C}_{i-1,j} + \alpha \cdot C_{i,j}$$

$$\Delta R_i = \frac{1}{N} \sum_{j=1}^{N} C_{i,j} - \overline{C}_{i-1,j}$$

In this equation α is the damping factor and may be set to for example 0.2 in which case the estimate for the running mean of a specific column i at row j will be a weighted sum of the estimated running mean for column i−1 at row j and the current pixel value at row j and column i. The estimated difference between values of row j and the values of neighboring rows ($\Delta R_i$) can now be approximated by taking the difference of each value $C_{i,j}$ and the running recursive mean of the neighbors above row i ($\overline{C}_{i-1,j}$). Estimating the mean difference this way is not as accurate as taking the true mean difference since only rows above are used but it requires that only one row of running means are stored as compared to several rows of actual pixel values be stored.

In one embodiment, referring to FIG. 13A, the process flow of method 1320 may implement a recursive mode of operation, wherein the previous column and row correction terms are applied before calculating row and column noise, which allows for correction of lower spatial frequencies when the image is high pass filtered prior to estimating the noise.

Generally, during processing, a recursive filter re-uses at least a portion of the output data as input data. The feedback input of the recursive filter may be referred to as an infinite impulse response (IIR), which may be characterized, e.g., by exponentially growing output data, exponentially decaying output data, or sinusoidal output data. In some implementations, a recursive filter may not have an infinite impulse response. As such, e.g., some implementations of a moving average filter function as recursive filters but with a finite impulse response (FIR).

In various embodiments, an infrared imaging system may be implemented with an infrared sensor array that is fixably positioned to substantially de-align rows and columns of infrared sensors while a thermal image frame is captured of a scene. For example, in some embodiments, the infrared sensor array may be fixably positioned in a rotated orientation relative to the scene (e.g., rotated relative to the housing and/or rotated about an optical axis of the infrared imaging system). De-alignment of the infrared sensor array may prevent the rows and columns of infrared sensors from being substantially parallel with one or more substantially horizontal and/or substantially vertical features of the scene. As a result, such features of the scene may be imaged across several different rows and columns of the infrared sensors and may not be generally aligned with rows and columns of pixels of the captured thermal image frame.

Such de-aligned orientations of the infrared sensor array may result in fewer row and column noise artifacts exhibited in captured thermal image frames of scenes including substantially horizontal and/or substantially vertical features. Moreover, such de-aligned orientations may prevent the imaged features from aligning with row and column noise and/or image artifacts that may result from noise reduction techniques applied to such row and column noise.

In some embodiments, an infrared imaging system may be expected to be used in one or more particular physical orientations. For example, for a handheld infrared imaging system, an expected physical orientation may be a comfortable position in which the imaging system is usually held by a user. In another embodiment, for a mounted infrared imaging system, an expected physical orientation may be a position in which the infrared imaging system is usually mounted. In these and similar embodiments, while the infrared imaging system is positioned in an expected physical orientation, rows and columns of the infrared sensor array may be de-aligned from horizontal and vertical features of the scene as discussed. In some embodiments, the expected physical orientation may be a physical orientation in which the housing or other components of the imaging system are generally parallel to a first reference plane (e.g., a plane generally parallel to the ground) and the infrared sensor array may be generally parallel to and facing a second reference plane (e.g., a plane corresponding to a view of the scene as perceived by the infrared sensor array). Other orientations are also contemplated.

Figure 17:
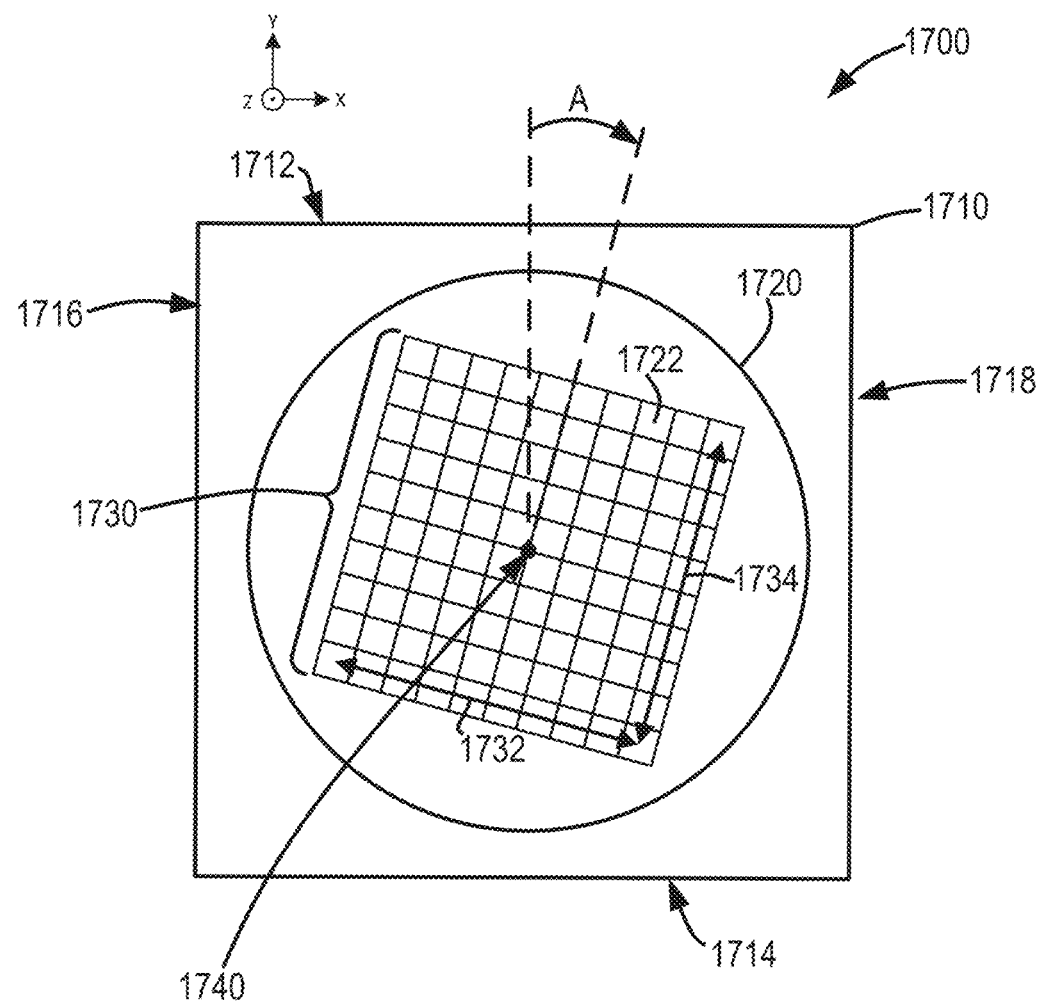
FIG. 17 illustrates an infrared imaging system with a de-aligned infrared sensor array installed in a housing in accordance with an embodiment of the disclosure.
Figure 18:
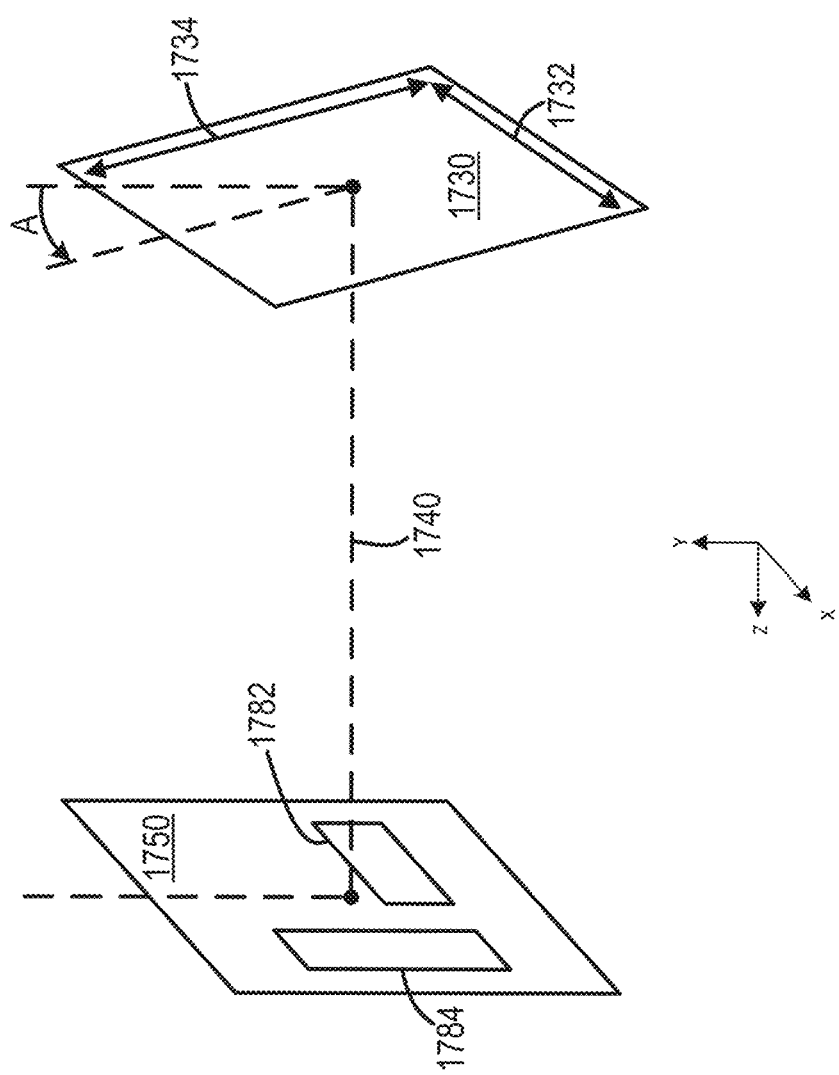
FIG. 18 illustrates a de-aligned infrared sensor array relative to a scene to be imaged in accordance with an embodiment of the disclosure.

FIG. 17 illustrates an infrared imaging system 1700 with a de-aligned infrared sensor array 1730 installed in a housing 1710 in accordance with an embodiment of the disclosure. FIG. 18 illustrates infrared sensor array 1730 relative to a scene 1750 to be imaged in accordance with an embodiment of the disclosure. In this regard, FIG. 17 provides a view of imaging system 1700 from the perspective of scene 1750.

As shown in FIG. 17, infrared sensor array 1730 includes a plurality of infrared sensors 1722 implemented in a plurality of rows 1732 and columns 1734. Although a 10 by 10 array of infrared sensors 1722 is illustrated in FIG. 17, and desired array size may be used. Rows 1732 and columns 1734 may be substantially de-aligned with various features of scene 1750. For example, as shown in FIG. 18, a substantially horizontal feature 1782 may be substantially parallel to an X axis, and a substantially vertical feature 1784 may be substantially parallel to a Y axis. As shown in FIGS. 17 and 18, rows 1732 and columns 1734 may be de-aligned with respect to the X and Y axes (e.g., by an angle A).

In some embodiments, infrared sensor array 1730 may be de-aligned relative to one or more surfaces of housing 1710. For example, in the particular embodiment illustrated in FIG. 17, housing 1710 includes surfaces 1712 and 1714 substantially parallel to the X axis, and surfaces 1716 and 1718 substantially parallel to the Y axis. Infrared sensor array 1730 may be fixably positioned within housing 1710 to substantially de-align rows 1732 and columns 1734 of infrared sensors 1722 (e.g., by angle A) such that rows 1732 and columns 1734 are not parallel to the X and Y axes, or any of surfaces 1712, 1714, 1716, and 1718 as shown in FIG. 17. As a result, rows 1732 and columns 1734 of infrared sensors 1722 will also be de-aligned with horizontal feature 1782 and vertical feature 1784 (e.g., by angle A as shown in FIG. 18).

In the embodiments shown in FIGS. 17 and 18, an expected physical orientation of imaging system 1700 may correspond to surfaces 1712 and 1714 of housing 1710 being positioned substantially parallel to an X-Z plane (e.g., corresponding to the X and Z axes), and surfaces 1716 and 1718 of housing 1710 being positioned substantially parallel to a Y-Z plane (e.g., corresponding to the Y and Z axes). Although housing 1710 is illustrated with a generally square cross section in FIG. 17, any desired shape may be used. In this regard, straight (e.g., substantially planar) external surfaces of housing 1710 may be used in some embodiments, but other internal and external surfaces are also contemplated. Accordingly, the generally square cross section of housing 1710 in FIG. 17 is provided only to illustrate one example of an expected physical orientation of imaging system 1700 when in use. Accordingly, in other expected physical orientations, some surfaces or no surfaces of imaging system 1700 may be parallel to the X-Z or Y-Z planes.

In some embodiments, infrared sensor array 1730 may be de-aligned based on a rotational offset. For example, infrared sensor array 1730 may include an optical axis 1740 along which infrared radiation is received. While mounted within housing 1710, infrared sensor array 1730 may be rotationally offset (e.g., by angle A) about optical axis 1740. Accordingly, while infrared imaging system 1700 is positioned in an expected physical orientation, infrared sensor array 1730 may be rotationally offset within an X-Y plane (e.g., corresponding to the X and Y axes) relative to housing 1710, scene 1750, and/or other aspects.

In some embodiments, imaging system 1700 may include one or more optical components 1720 substantially aligned with optical axis 1740. In one embodiment, image capture component 1730 may be disposed within housing 1710 and behind optical components 1720 such that electromagnetic radiation from scene 1750 passes through optical components 1720 before being received by image capture component 1710.

In some embodiments, various portions of infrared imaging system 1700 may be implemented by components previously described herein. For example, infrared imaging system 1700 may include any components of infrared imaging module 100, host device 102, system 1200, and/or other components as may be desired in particular implementations.

In one embodiment, infrared imaging system 1700 may be implemented by infrared imaging module 100. For example, infrared sensors 1722 and infrared sensor array 1730 may be implemented by infrared sensors 132 of infrared sensor assembly 128, optical component 1720 may be implemented by optical element 180, and housing 1710 may be implemented by housing 120, socket 104, and/or host device 102. In such an embodiment, infrared imaging system 1700 may be implemented with one or more processing devices such as, for example, processing module 160, processor 195, and/or other devices to perform various operations described herein. Also in such an embodiment, infrared imaging system 1700 may be implemented with one or more memories such as, for example, memory 196 and/or other memories. Other embodiments using various components of imaging module 100 are also contemplated.

In another embodiment, infrared imaging system 1700 may be implemented by system 1200. For example, infrared sensors 1722 and infrared sensor array 1730 may be implemented by image capture component 1230. In such an embodiment, infrared imaging system 1700 may be implemented with one or more processing devices such as, for example, processing component 1210 and/or other devices to perform various operations described herein. Also in such an embodiment, infrared imaging system 1700 may be implemented with one or more memories such as, for example, memory component 1220 and/or other memories. Other embodiments using various components of system 1200 are also contemplated.

Figure 19:
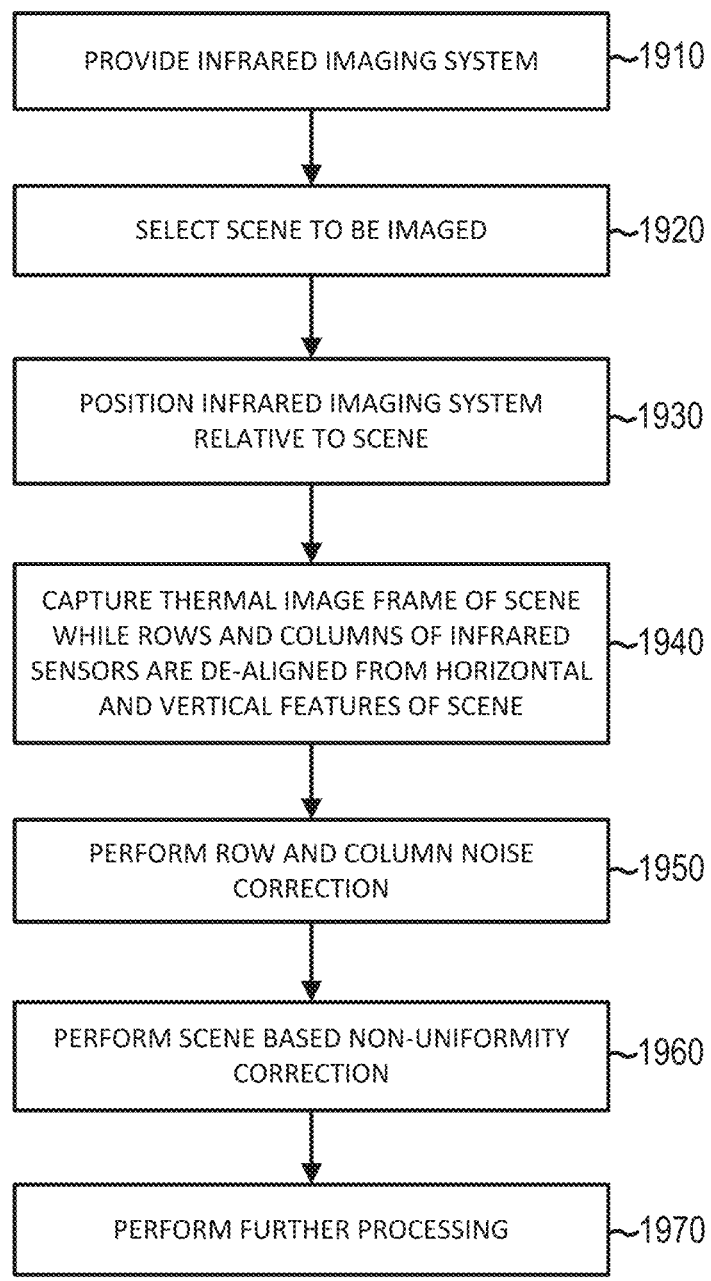
FIG. 19 illustrates a flow diagram of operations to obtain a thermal image frame using a de-aligned infrared sensor array in accordance with an embodiment of the disclosure.

FIG. 19 illustrates a flow diagram of operations to obtain a thermal image frame using de-aligned infrared sensor array 1730 in accordance with an embodiment of the disclosure. At block 1910, infrared imaging system 1700 is provided (e.g., assembled and/or otherwise manufactured). Block 1910 may include various operations including, for example: providing infrared sensor array 1730, providing housing 1710; inserting infrared sensor array 1730 into housing 1710; positioning infrared sensor array 1730 in a substantially de-aligned position (e.g., by rotating infrared sensor array 1730 about optical axis 1740, rotating infrared sensor array 1730 relative to housing 1710, and/or other positioning techniques); fixing infrared sensor array 1730 in the substantially de-aligned position (e.g., by securing infrared sensor array 1730 directly to housing 1710 and/or to one or more other structures using appropriate mechanisms, adhesives, and/or other techniques); installing optical components 1720; installing any other components of infrared imaging system 1700; and/or other operations as appropriate.

At block 1920, a particular scene 1750 to be imaged is selected. In one embodiment, such selection may be performed by a user of infrared imaging system 1700. In another embodiment, such selection may be performed by infrared imaging system 1700 itself (e.g., through appropriate selection processes performed by one or more processing devices).

At block 1930, infrared imaging system 1700 is positioned relative to scene 1750. In one embodiment, such positioning may be performed by a user of infrared imaging system 1700. In another embodiment, such positioning may be performed by infrared imaging system 1700 itself (e.g., through operation of appropriate actuators and/or other mechanisms).

At block 1940, infrared imaging system 1700 captures a thermal image frame of scene 1750. While the thermal image frame is captured in block 1940, rows 1732 and columns 1734 of infrared sensors 1722 of infrared sensor array 1730 are substantially de-aligned from substantially horizontal features (e.g., substantially horizontal feature 1782) and substantially vertical features (e.g., substantially vertical feature 1784) of scene 1750 as discussed.

Figure 20:
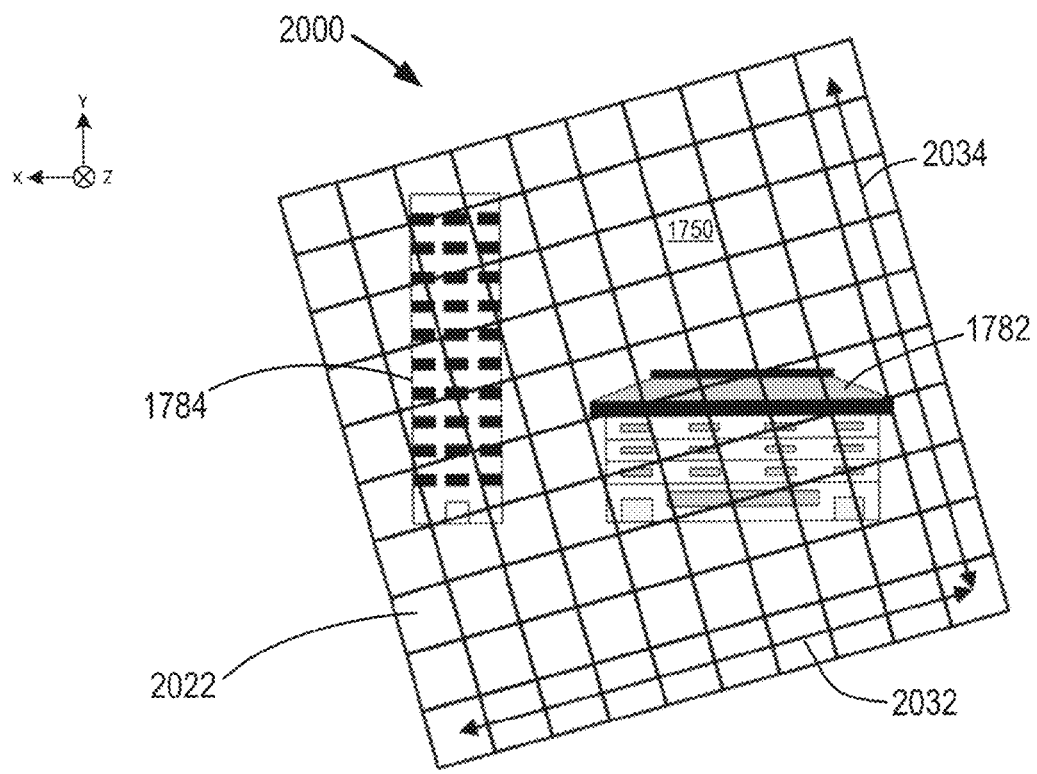
FIG. 20 illustrates a thermal image frame obtained by various operations of FIG. 19 in accordance with an embodiment of the disclosure.

For example, FIG. 20 illustrates a thermal image frame 2000 captured during block 1940 of FIG. 19 in accordance with an embodiment of the disclosure. Thermal image frame 2000 includes a plurality of pixels 2022 arranged in a plurality of rows 2032 and columns 2034. In some embodiments, pixels 2022 may correspond to infrared sensors 1722 of infrared sensor array 1730. In other embodiments, greater or fewer pixels 2022 may be used relative to infrared sensors 1722 (e.g., using appropriate pixel interpolation techniques and/or other processing). In the particular example shown in FIG. 20, the size of pixels 2022 has been enlarged and the number of pixels 2022 have been reduced to more clearly illustrate the de-alignment of pixel rows 2032 and pixel columns 2034 relative to features 1782 and 1784. As shown in FIG. 20, features 1782 and 1784 are substantially horizontal and substantially vertical buildings in this example, however any desired features may be imaged in various embodiments.

At block 1950, row and column noise correction processing is performed on thermal image frame 2000 in accordance with the various techniques described herein. At block 1960, scene based NUC processing is performed on thermal image frame 2000 in accordance with the various techniques described herein.

Figure 21:
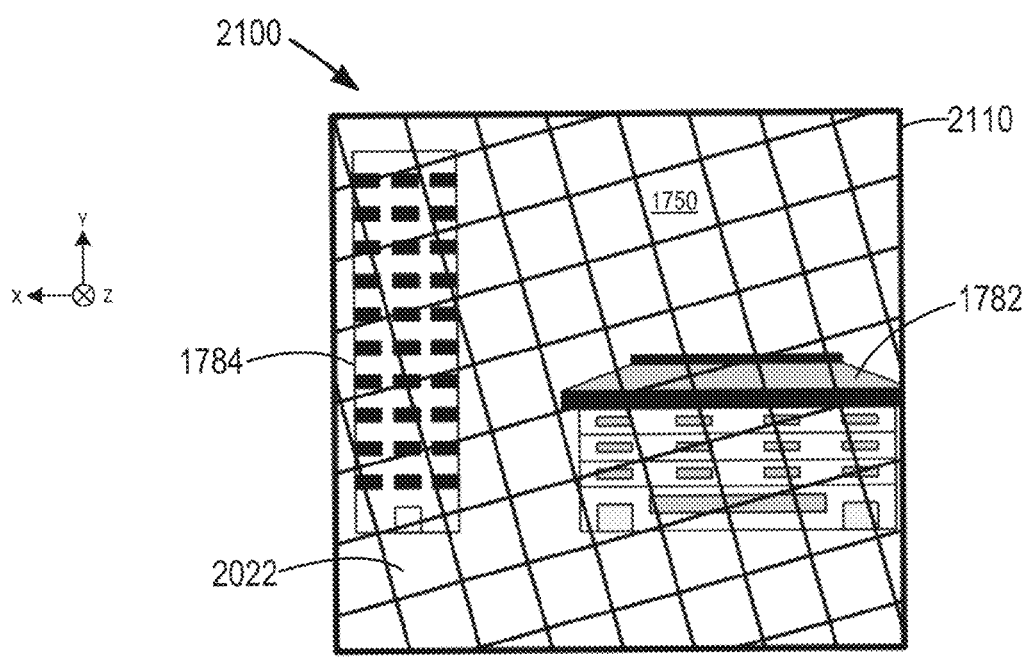
FIG. 21 illustrates a cropped thermal image frame obtained by various operations of FIG. 19 in accordance with an embodiment of the disclosure.

At block 1970, further processing may be performed on thermal image frame 2000 as may be desired in particular implementations. For example, thermal image frame 2000 may be processed to provide a cropped thermal image frame 2100 as shown in FIG. 21 in accordance with an embodiment of the disclosure. In particular, cropped thermal image frame 2100 has been cropped with a border 2110 that is substantially parallel with features 1782 and 1784 of scene 1750. As a result, cropped thermal image frame 2100 may generally appear to have an orientation corresponding to the view of scene 1750 from infrared imaging system 1700. In the particular example shown in FIG. 21, the size of pixels 2022 has been enlarged and the number of pixels 2022 have been reduced for purposes of illustration similar to FIG. 20.

In view of the present disclosure, it will be appreciated that the use of de-aligned infrared sensor array 1730 permits thermal image frame 2000 and cropped thermal image frame 2100 to exhibit improvements over images captured with conventionally aligned sensors. For example, because thermal image frame 2100 was captured by de-aligned rows 1732 and columns 1734 of infrared sensor array 1730, thermal image frame 2100 and cropped thermal image frame 2100 may exhibit fewer row and column noise artifacts associated with features 1782 and 1784. In addition, any possible artifacts resulting from noise reduction operations (e.g., row and column noise correction processing of block 1950 and/or other noise reduction operations) will not be aligned with features 1782 and 1784 in thermal image frame 2100 and cropped thermal image frame 2100.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. An infrared imaging system comprising:
an infrared sensor array comprising a plurality of infrared sensors arranged in rows and columns and adapted to capture a thermal image frame of a scene exhibiting at least one horizontal or vertical feature;
a housing;
wherein the infrared sensor array is permanently positioned within the housing during manufacture to intentionally de-align the rows and columns from the at least one horizontal or vertical feature while the thermal image frame is captured to distribute the at least one feature across a plurality of the de-aligned rows and columns;
a processing device adapted to perform a row and column noise reduction process on the captured thermal image frame to determine and apply row and column fixed pattern noise offset terms to provide a processed thermal image frame, wherein the distribution of the feature across the de-aligned rows and columns causes the processed thermal image frame to exhibit reduced row and column noise artifacts resulting from the row and column noise reduction process; and
wherein the permanent position of the infrared sensor array relative to and within the housing is configured to passively de-align the rows and columns while the infrared imaging system is capturing the thermal image frame, and
wherein the infrared imaging system is adapted to be operated to capture the thermal image frame without rotating the infrared sensor array from the permanent position.

2. The infrared imaging system of claim 1, wherein:
the housing comprises a surface parallel to the at least one feature; and
the infrared sensor array is permanently positioned within the housing to intentionally de-align the rows and columns from the surface while the thermal image frame is captured.

3. The infrared imaging system of claim 2, wherein the surface is a planar external surface of the housing.

4. The infrared imaging system of claim 1, wherein the infrared sensor array is rotationally offset relative to the housing.

5. The infrared imaging system of claim 1, wherein the infrared sensor array is rotationally offset about an optical axis of the infrared imaging system.

6. The infrared imaging system of claim 1, wherein:
the captured thermal image frame comprises rows and columns of pixels intentionally de-aligned from the at least one feature; and
the processing device, for the row and column noise reduction process, is adapted to:
calculate, for each pixel, a difference between a center pixel and a plurality of neighboring pixels to determine column neighbor differences,
generate, for each column of pixels, a histogram of the column neighbor differences,
use the column neighbor differences to determine column noise offset terms for corresponding columns of pixels, and
apply column noise filter correction to the captured image based on the column noise offset terms, wherein the column noise offset term is applied to at least a majority of the pixels in each corresponding column.

7. The infrared imaging system of claim 1, wherein the thermal image frame is an unblurred thermal image frame, wherein the processing device, for the row and column noise reduction process, is adapted to:
receive an intentionally blurred thermal image frame;
process the blurred thermal image frame to determine a plurality of non-uniformity correction (NUC) terms; and
apply the NUC terms to the unblurred thermal image frame.

8. A method of operating the infrared imaging system of claim 1, the method comprising:

capturing the thermal image frame while the rows and columns are intentionally de-aligned from the at least one feature.

9. An infrared imaging system comprising:
an infrared sensor array comprising a plurality of infrared sensors arranged in rows and columns and adapted to capture a thermal image frame of a scene exhibiting at least one horizontal or vertical feature;
a housing comprising a surface parallel to the at least one feature;
wherein the infrared sensor array is permanently positioned within the housing during manufacture to intentionally de-align the rows and columns from the surface while the thermal image frame is captured to distribute the at least one feature across a plurality of the de-aligned rows and columns;
a processing device adapted to perform a row and column noise reduction process on the captured thimble image frame to determine and apply row and column fixed pattern noise offset terms to provide a processed thermal image frame, wherein the distribution of the feature across the de-aligned rows and columns causes the processed thermal image frame to exhibit reduced row and column noise artifacts resulting from the row and column noise reduction process; and
wherein the permanent position of the infrared sensor array relative to and within the housing is configured to passively de-align the rows and columns while the infrared imaging system is capturing the thermal image frame, and
wherein the infrared imaging system is adapted to be operated to capture the thermal image frame without rotating the infrared sensor array from the permanent position.

10. The infrared imaging system of claim 9, wherein the surface is a planar external surface of the housing.

11. The infrared imaging system of claim 9, wherein the infrared sensor array is permanently positioned within the housing to intentionally de-align the rows and columns from the at least one feature while the thermal image frame is captured.

12. The infrared imaging system of claim 9, wherein the infrared sensor array is rotationally offset relative to the housing.

13. The infrared imaging system of claim 9, wherein the infrared sensor array is rotationally offset about an optical axis of the infrared imaging system.

14. The infrared imaging system of claim 9, wherein:
the captured thermal image frame comprises rows and columns of pixels intentionally de-aligned from the at least one feature; and
the processing device, for the row and column noise reduction process, is adapted to:
calculate, for each pixel, a difference between a center pixel and a plurality of neighboring pixels to determine column neighbor differences,
generate, for each column of pixels, a histogram of the column neighbor differences,
use the column neighbor differences to determine column noise offset terms for corresponding columns of pixels, and
apply column noise filter correction to the captured image based on the column noise offset terms, wherein the column noise offset term is applied to at least a majority of the pixels in each corresponding column.

15. The infrared imaging system of claim 9, wherein the thermal image frame is an unblurred thermal image frame, the processing device, for the row and column noise reduction process, is adapted to:
receive an intentionally blurred thermal image frame;
process the blurred thermal image frame to determine a plurality of non-uniformity correction (NUC) terms; and
apply the NUC terms to the unblurred thermal image frame.

16. A method of operating the infrared imaging system of claim 9, the method comprising:
capturing the thermal image frame while the rows and columns are intentionally de-aligned from the at least one feature.

17. A method comprising:
capturing a thermal image frame of a scene exhibiting at least one substantially horizontal or vertical feature;
wherein the capturing is performed by an infrared sensor array comprising a plurality of infrared sensors arranged in rows and columns;
wherein the infrared sensor array is permanently positioned within a housing of an infrared imaging system, the infrared sensory array being permanently positioned within the housing during manufacture to intentionally de-align the rows and columns from the at least one substantially horizontal or vertical feature while the thermal image frame is captured;
performing row and column noise reduction process on the captured thermal image frame to determine and apply row and column fixed pattern noise offset terms to provide a processed thermal image frame;
wherein a distribution of the feature across the de-aligned rows and columns causes the processed thermal image frame to exhibit reduced row and column noise artifacts resulting from the row and column noise reduction process; and
wherein the permanent position of the infrared sensor array relative to and within the housing is configured to passively de-align the rows and columns while the infrared imaging system is capturing the thermal image frame, and
wherein the infrared imaging system is adapted to be operated to capture the thermal image frame without rotating the infrared sensor array from the permanent position.

18. The method of claim 17, further comprising:
providing the infrared sensor array;
providing the housing; and
permanently positioning the infrared sensor array within the housing to intentionally de-align the rows and columns.

19. The method of claim 17, wherein:
the housing comprises a surface parallel to the at least one feature; and
the infrared sensor array is fixably and securely positioned within the housing to intentionally de-align the rows and columns from the surface while the thermal image frame is captured.

20. The method of claim 19, wherein the surface is a planar external surface of the housing.

21. The method of claim 17, wherein the infrared sensor array is rotationally offset relative to the housing.

22. The method of claim 17, wherein the infrared sensor array is rotationally offset about an optical axis of the infrared imaging system.

23. The method of claim 17, wherein:

the captured thermal image frame comprises rows and columns of pixels intentionally de-aligned from the at least one feature; and the method further comprises:
- calculating, for each pixel, a difference between a center pixel and a plurality of neighboring pixels to determine column neighbor differences,
- generating, for each column of pixels, a histogram of the column neighbor differences,
- using the column neighbor differences to determine column noise offset terms for corresponding columns of pixels, and
- applying column noise filter correction to the captured image based on the column noise offset terms, wherein the column noise offset term is applied to at least a majority of the pixels in each corresponding column.

24. The method of claim 17, wherein:

the thermal image frame is an unblurred thermal image frame; and the method further comprises:
- receiving an intentionally blurred thermal image frame,
- processing the blurred thermal image frame to determine a plurality of non-uniformity correction (NUC) terms, and
- applying the NUC terms to the unblurred thermal image frame.

25. An infrared imaging system adapted to be operated in accordance with the method of claim 17.

* * * * *